(12) United States Patent
Burlingame et al.

(10) Patent No.: US 8,233,102 B2
(45) Date of Patent: *Jul. 31, 2012

(54) APPARATUS AND METHOD FOR ADJUSTABLE VARIABLE TRANSMISSIVITY POLARIZED EYEGLASSES

(75) Inventors: Robert G. Burlingame, Sherman, TX (US); Ernest G. Bylander, Sherman, TX (US); Robin Hines, Tullahoma, TN (US); Walter Wen, Garland, TX (US)

(73) Assignee: RGB Optics, LLC, Sherman, TX (US)

( * ) Notice: Subject to any disclaimer, the term of this patent is extended or adjusted under 35 U.S.C. 154(b) by 503 days.

This patent is subject to a terminal disclaimer.

(21) Appl. No.: 12/402,422

(22) Filed: Mar. 11, 2009

(65) Prior Publication Data
US 2009/0213282 A1    Aug. 27, 2009

Related U.S. Application Data

(63) Continuation of application No. 12/072,535, filed on Feb. 27, 2008, now abandoned.

(51) Int. Cl.
*G02F 1/1335* (2006.01)
(52) U.S. Cl. .......................................................... 349/13
(58) Field of Classification Search ...................... 349/13
See application file for complete search history.

(56) References Cited

U.S. PATENT DOCUMENTS

| | | | |
|---|---|---|---|
| 4,181,408 A | 1/1980 | Senders | |
| 4,279,474 A * | 7/1981 | Belgorod | 349/13 |
| 4,968,127 A | 11/1990 | Russell et al. | |
| 5,074,647 A | 12/1991 | Fergason et al. | |
| 5,184,156 A | 2/1993 | Black et al. | |
| 5,327,269 A | 7/1994 | Tilton et al. | |
| 5,510,609 A | 4/1996 | Ackermann | |
| 5,654,786 A * | 8/1997 | Bylander | 351/49 |
| 5,841,507 A | 11/1998 | Barnes | |
| 5,959,705 A | 9/1999 | Fergason | |
| 6,067,129 A | 5/2000 | Fergason | |
| 6,491,391 B1 | 12/2002 | Blum et al. | |
| 6,884,987 B2 | 4/2005 | Hamilton et al. | |
| 6,897,917 B2 | 5/2005 | Cavanaugh et al. | |
| 2009/0213283 A1 | 8/2009 | Burlingame | |

FOREIGN PATENT DOCUMENTS

| | | |
|---|---|---|
| DE | 2530039 A1 | 1/1984 |
| JP | 55100527 | 7/1980 |
| JP | 61177434 | 8/1986 |
| JP | 01150114 | 6/1989 |

(Continued)

OTHER PUBLICATIONS

Written Opinion Search Report for International PCT No. PCT/US2009/035246 dated Aug. 17, 2009.

*Primary Examiner* — Thanh-Nhan P Nguyen

(57) ABSTRACT

Adjustable variable transmissivity (AVT) eyeglasses for patients. In one embodiment, the eyeglasses include: (1) a frame having earpieces coupled thereto, (2) liquid crystal lenses coupled to the frame and configured to assume a transmissivity in response to a lens control signal, (3) a light sensor coupled to the frame and configured to sense light in a field of view and produce a sensor signal in response thereto, (4) a light plug coupled to the frame and configured to define a field of view and (5) an electronic circuit coupled to the frame and configured to employ the sensor signal to generate the lens control signal.

32 Claims, 16 Drawing Sheets

FOREIGN PATENT DOCUMENTS

| | | |
|---|---|---|
| JP | 02050123 | 2/1990 |
| JP | 02230116 | 9/1990 |
| JP | 03163413 | 7/1991 |
| JP | 06027425 | 2/1994 |
| JP | 06043406 | 2/1994 |
| JP | 08136883 | 5/1996 |
| JP | 09179075 | 7/1997 |
| WO | 8102795 | 10/1981 |
| WO | 9324858 A1 | 12/1993 |

\* cited by examiner

FIG. 11

| FIG. 11A |
| FIG. 11B |

300

EYE GLASSES PROGRAM

302 {
\*Hardware interrupt 1 /\* serial port activity - allows parameters to be entered externally from PC \*/
Enter L_min
Else L_min = 15 (cd/m ^ 2) /\* default read from flash memory \*/ } 304
Return 306 {
\* Initialize program /\* runs on bootup - values are read from flash memory \*/
    T_min = 0.06 /\* calibrated value \*/
    T_max = 0.29 /\* calibrated value \*/
    alpha = (calibrated detector response, L_in = alpha \* V_det)
    beta = internal timer1 freq / PWM clock freq = f1 / f2
    gamma = 1.1 /\* maximum duty cycle change per PWM pulse \*/
    L1 = L_min
    L2 = 4000 (cd/m ^ 2)
    read T1, T2, a1, b1, a2, b2, a3, b3, D_min, D_max from flash memory
    set GATE line off
    reset timer1
    set count2 = 0.25\*beta /\* 25% duty cycle initially \*/
    run program \*Run 308 {
\*Run—glasses operational control program
loop1
    If PWM transitions from low to high /\* 0V to > 0.9Vcc \*/
        start timer1
        get photodector voltage V_det
        L_in = alpha \* V_det
        set GATE line on
        T = \*Transmissivity(L_in)        \*/ returns desired transmissivity T \*/
        DC = \*DutyCycle(T)          \*/ returns required duty cycle \*/
        prev_count = count2
        count2 = DC \* beta
311 {
        if count2 > prev_count
            count2 = MIN(count2, prev_count\* gamma)
        else
            count2 = MAX(count2, prev_count / gamma)
        end if
    end if
    if timer1 > count2
        set GATE line off
        reset timer1 } 312
    end if
repeat loop1
end

```
/*Hardware interrupt 2 */ services control buttons */
    left button pressed
        set L1 = alpha*V_det   /* L1 set to current ambient    }316
    right button pressed
        set L2 = alpha*V_det   /* L2 set to current ambient    }317
    both buttons pressed
        set all defaults: L1 = L_min, L2 = 4000                }318
    Return
```
315 { (above block)

```
/*Transmissivity(L_in) /* returns desired T given L_in */
call Coefficients(a,b)
case
    L_in < L1: T = T_max
    L_in > L2: T = T_min
else
    T = a * log(L_in) + b
end case
return T
```
320 { (above block)

```
/*DutyCycle(T)  /* returns duty cycle required for a given transn
/* T1 = 0.06 typically from LCD response curve
   T2 = 0.275 typically from LCD response curve
   a1, b1, a2, b2, a3, b3 linear fit coefficients          }322
   D_min = minimum duty cycle - typically 0.05
   D_max = maximum duty cycle - typically 0.5 */
case
    T<T1: D = MAX(a1*T + b1, D_min)
    T>T2: D = MIN(a3*T + b3, D_max)
else                                                       }324
    D = a2*T + b2
end case
return D
```
325 { (above block)

```
/*Coefficients()  /* computes transmissivity coefficients */
    a = (T_max - T_min) / (log(L2) - log(L1))
    b = T_min - a * log(L2)
return a,b
```
327 { (above block)

*FIG. 11B*

APPARATUS AND METHOD FOR ADJUSTABLE VARIABLE TRANSMISSIVITY POLARIZED EYEGLASSES

CROSS-REFERENCE TO PROVISIONAL APPLICATION

This application is a continuation of U.S. patent application Ser. No. 12/072,535, filed by Robert G. Burlingame, et al. on Feb. 27, 2008, now abandoned entitled "Apparatus and Method for Adjustable Variable Transmissivity Polarized Eyeglasses," commonly assigned with the invention and incorporated herein by reference.

TECHNICAL FIELD OF THE INVENTION

The invention relates generally to the field of treatment for age-related macular degeneration and, more specifically, to eyeglasses that electronically dim and brighten according to ambient light conditions.

BACKGROUND OF THE INVENTION

People with age-related macular degeneration (ARMD) and similar diseases affecting the ocular media have long retinal adaptation times leading to poor visual acuity during adaptation. Dark adaptation times may be measured in tens of minutes in typical cases. The lack of visual acuity may cause serious mobility problems in people with ARMD, especially near curbs and steps in bright sunlight. Generally, there are problems in the aged relating to contrast sensitivity in varying lighting conditions leading to vision problems while driving during the night time.

Ophthalmologists have long sought a prescriptive solution wherein the ARMD patient may be fitted with light absorbing eyeglasses that restrict the amount of light reaching the patient's eyes thereby increasing visual acuity. More particularly, ophthalmologists have sought prescription eyeglasses. Ophthalmologists have also sought eyeglasses that are capable of adapting to a wide range of lighting conditions, ranging from the office environment in which light luminance levels are typically on the order of 12-18 cd/m$^2$ to a bright sunny day outside, in which luminance levels may be on the order of 5000 cd/m$^2$. Ophthalmologists have further sought prescription eyeglasses that can respond quickly to keep the retinal illumination level near an ideal value such that dark adaptation effects are not impaired and retinal bleaching does not occur.

While light absorbing eyeglasses exist in the prior art, they contain fundamental flaws. One major flaw is the inability of the ophthalmologist to adjust for patient-to-patient variations of dark to bright transmission ranges, and for the patient's overall illumination response. Secondly, the control group studies of subject response to light absorbing eyeglasses were made according to Ross, et al., in "Design and Evaluation of Liquid Crystal (LC) Dark Adapting Eyeglasses for Persons with Low Vision", Final Report, Project #C776-RA, Atlanta V.A. Rehab Center, March 1997, indicating that subjects preferred to maintain some control over the lens behavior of the light absorbing eyeglasses. Ophthalmologists have therefore sought eyeglasses that allow for limited patient manual override.

Adjustable variable transmissivity (AVT) eyeglasses may be useful for sports applications, occupational applications and medical applications apart from ARMD. For medical use, AVT eyeglasses may be useful in the treatment of retinal pigmentosa, ocular albinism, choroidermia, gyrate atrophy, corneal scarring, cataracts and ureitis. A variety of outdoor sporting activities including fishing, hunting, skiing, golf and baseball may benefit from AVT eyeglasses. Occupational safety applications that involve driving, heavy equipment operation, low light military or police maneuvers, oxyacetylene welding and glassblowing may further benefit from AVT eyeglasses.

SUMMARY OF THE INVENTION

One aspect of the invention provides eyeglasses. In one embodiment, the eyeglasses include: (1) a frame having earpieces coupled thereto, (2) liquid crystal lenses coupled to the frame and configured to assume a transmissivity in response to a lens control signal, (3) a light sensor coupled to the frame and configured to sense light in a field of view and produce a sensor signal in response thereto, (4) a light plug coupled to the frame and configured to define a field of view and (5) an electronic circuit coupled to the frame and configured to employ the sensor signal to generate the lens control signal.

In another embodiment, the eyeglasses include: (1) a frame having earpieces rotatably coupled thereto, (2) liquid crystal lenses coupled to the frame and configured to assume a transmissivity in response to a lens control voltage signal, (3) a light sensor coupled to the frame and configured to sense light in a field of view forward of the eyeglasses and produce a sensor current signal in response thereto, (4) a light plug coupled to the frame and configured to define a field of view relative to the lenses, the light plug having at least two apertures positionally arranged to define the field of view in a horizontal plane and in a vertical plane and (5) an electronic circuit coupled to the frame and configured to employ the sensor current signal to generate the lens control voltage signal.

Another aspect of the invention provides a method of manufacturing eyeglasses. In one embodiment, the method includes: (1) forming a frame having earpieces coupled thereto, (2) coupling liquid crystal lenses to the frame, the lenses configured to assume a transmissivity in response to a lens control signal, (3) coupling a light sensor to the frame, the light sensor configured to sense light in a field of view and produce a sensor signal in response thereto, (4) coupling a light plug to the frame, the light plug configured to define a field of view and (5) coupling an electronic circuit to the frame, the lenses and the light sensor, the electronic circuit configured to employ the sensor signal to generate the lens control signal.

BRIEF DESCRIPTION OF THE DRAWINGS

For a more complete understanding of the invention, reference is now made to the following descriptions taken in conjunction with the accompanying drawings, in which:

FIG. 11 is pseudocode listing of the modulation software used by the microprocessor to control the function of the eyeglasses and the lenses;

DETAILED DESCRIPTION

Figure 1A:
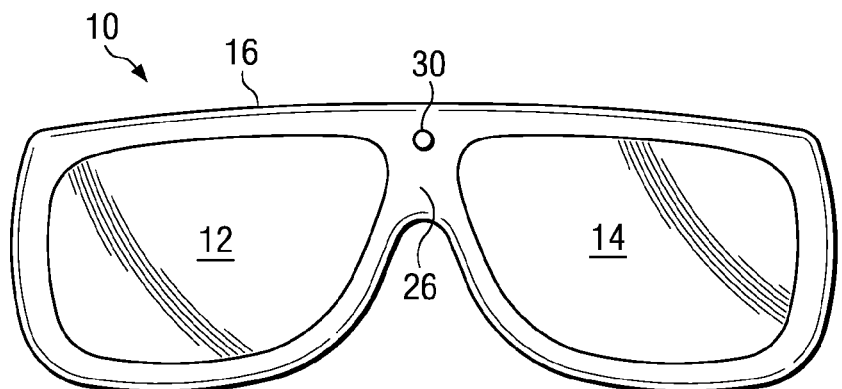
FIG. 1A is a frontal view of a first embodiment AVT eyeglasses showing the lens and the frames.

The numerous innovative teachings of the invention will be described with particular reference to certain embodiments (by way of example, and not of limitation). The invention teaches an apparatus and corresponding methodology for making and using adjustable variable transmissivity (AVT) eyeglasses.

Apparatus and methods are described herein that teach the construction and the use of light absorbing adjustable variable transmissivity (AVT) eyeglasses. Certain of the embodiments of the AVT eyeglasses include a set of frames and a pair of lenses attached to the frames, the set of lenses being made of liquid crystal substrates that change their transmittance upon application of an electric potential. Certain embodiments of the frames are made to fit a wearer's face over prescription eyewear and to house electronic circuits and batteries for controlling the function of the lenses. Additionally, the frames may allow for a light pipe connected to a light sensor to detect ambient light from the direction forward of the wearer with variable field of viewing using light pipe plugs to restrict the angle of view as well as the overall field of view. The frames may have earpieces attached to which the electronics substrates may be housed and to which a left control and a right control are fixed, the left and the right controls electronically connected to electronic circuits contained on the electronic substrates. In an alternative embodiment, the light pipe is configured to detect transmitted light through the lens to maintain a constant light level to the wearer's eye. In yet another embodiment, the electronic substrate may be housed in the frames instead of the earpieces.

The liquid crystal lens includes two substrates fixed together and having a liquid crystal material between them. The substrates further include an indium tin oxide (ITO) coated glass substrate with a polarizing film on one side and an alignment layer on the other side. A fail dark configuration of the alignment and polarizing layers is taught wherein the polarizers are set vertical and the alignment layers are set at −45° and +45° from the horizontal. The fail dark lens configuration causes the lens transmittance to go to a relatively low value when power is removed from the lenses. A fail light configuration is taught wherein the polarizers are set at a 90° angle from each other, one being in the vertical and the second being in the horizontal, the alignment layers being at −45° and +45° to the horizontal, respectively. The fail light lens configuration causes the lens transmittance to go to a relatively high value when power is removed from the lenses. Typical fail dark transmittance is about 6%, and typical fail light transmittance is about 29%.

Electronic circuits are taught to accomplish the lens control under different conditions. In the condition wherein ambient light is sensed, an analog electronics circuit and a digital electronic circuit is taught, the latter including the use of a microprocessor. An analog feedback control circuit is taught for the situation when transmitted light is sensed and it is desired to fix the transmitted light level at a given value. Electronic circuits in one embodiment of the invention use a variable duty cycle of alternating current square wave signal to affect control of the lens average voltage and thereby the lens transmissivity.

In the case of the microprocessor based electronics, methods are taught to automatically adjust the light level according to a desired transmissivity curve. In one embodiment, the desired transmissivity curve conforms to the well-known Weber-Fechner logarithmic response law. In other embodiments, linear response or other response curves may be used.

Moreover, methods are taught to use controls to affect the transmissivity curve, specifically upper and lower light level set points for the light sensor to control the duty cycle for maximum and minimum transmission of light through the lens.

A software program for controlling the function of variable transmissivity eyeglasses is explained taking into account the automatic light level adjustment according to a desired transmissivity curve and taking into account the use of controls.

Certain embodiments of the AVT eyeglasses are capable of adapting to a wide range of lighting conditions ranging from a typical office environment in which luminance levels may be on the order of 12-18 cd/m$^2$ to a bright, sunny day outside, in which luminance levels may be on the order of 5000 cd/m$^2$. Certain other of the embodiments of the AVT eyeglasses are capable of responding quickly to keep the retinal illumination level near an ideal value such that dark adaptation effects are not impaired and retinal bleaching does not occur. In certain embodiments, polarization arrangements yielding a yellow lens color are employed to achieve a superior contrast sensitivity.

While conventional light absorbing eyeglasses exist, they have fundamental flaws. One is the inability of the ophthalmologist to adjust for patient-to-patient variations of dark to bright transmission ranges, and for the patient's overall illumination response. Certain embodiments of the invention allows for such control by the ophthalmologist. Secondly, studies of subject response to light-absorbing eyeglasses were reported in Ross, et al., "Design and Evaluation of Liquid Crystal (LC) Dark Adapting Eyeglasses for Persons with Low Vision", Final Report, Project #C776-RA, Atlanta V.A. Rehab Center, March 1997, indicating that subjects preferred to maintain some control over the lens behavior of the light absorbing eyeglasses. Certain embodiments of the invention allow for limited patient manual override through the use of controls on the earpieces, one control setting the low light level characteristic of the lens function and the other control setting the upper light level limiting characteristic of the lens function.

Certain embodiments of the invention may be useful in the treatment of retinal pigmentosa, ocular albinism, choroidermia, gyrate atrophy, corneal scarring, cataracts and ureitis, in addition to ARMD. A variety of outdoor sporting activities including fishing, hunting, skiing, golf and baseball may benefit from the invention. Occupational safety applications include driving, heavy equipment operation, low light military or police maneuvers, oxyacetylene welding and glassblowing.

Figure 1B:
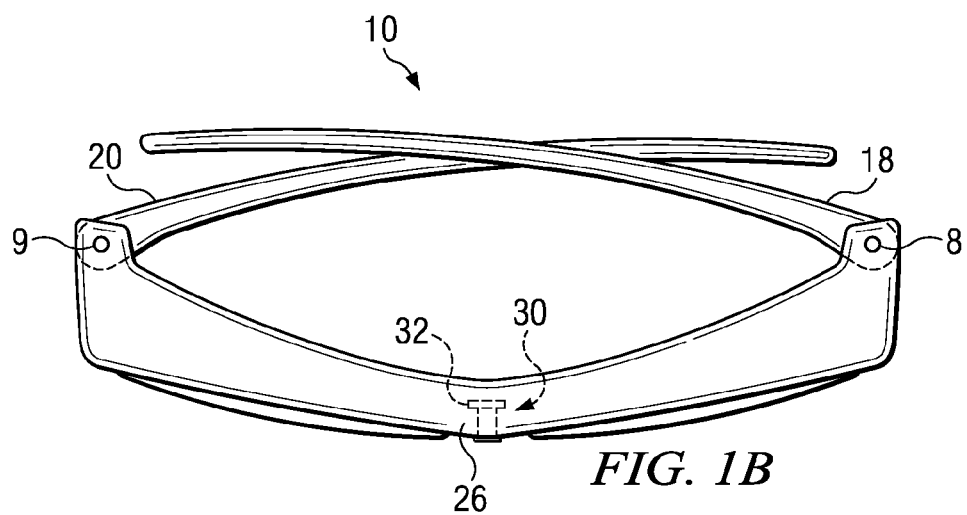
FIG. 1B is a top view of a first embodiment AVT eyeglasses showing the frames and the earpieces.
Figure 1C:
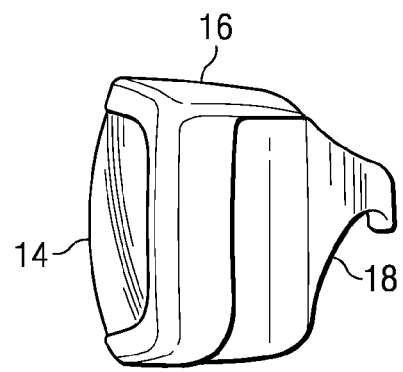
FIG. 1C is a side view of a first embodiment AVT eyeglasses while partially folded.

FIGS. 1A, 1B, 1C show a first embodiment frontal view, top view and side view, respectively, of a partially closed AVT eyeglasses 10 incorporating the invention. FIG. 1A is a frontal view of the AVT eyeglasses 10 that include the lenses 12 and 14 mounted in the frame 10. The lenses 12 and 14 have electronically controllable optical density for controlling the amount of light transmitted to a wearer's eyes. The structure of the lenses 12 and 14 is described in detail below. The sensor element 30 is integrated into the bridge area 26 of the frame 16 and contains a light sensor 32 that in the first embodiment senses ambient light in front of the eyeglasses 10. Rotatably attached to the frame 16 by the hinges 8 and 9, are the earpieces 18 and 20, respectively for holding the AVT eyeglasses securely on the wearer's head, the earpieces suitably folding for storage.

Figure 1D:
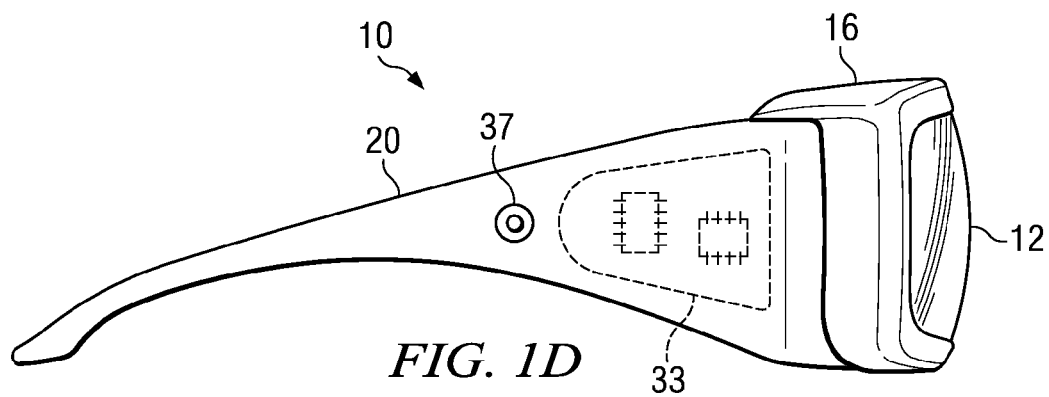
FIGS. 1D and 1E are right and left side views, respectively, of a first embodiment AVT eyeglasses while unfolded.
Figure 1E:
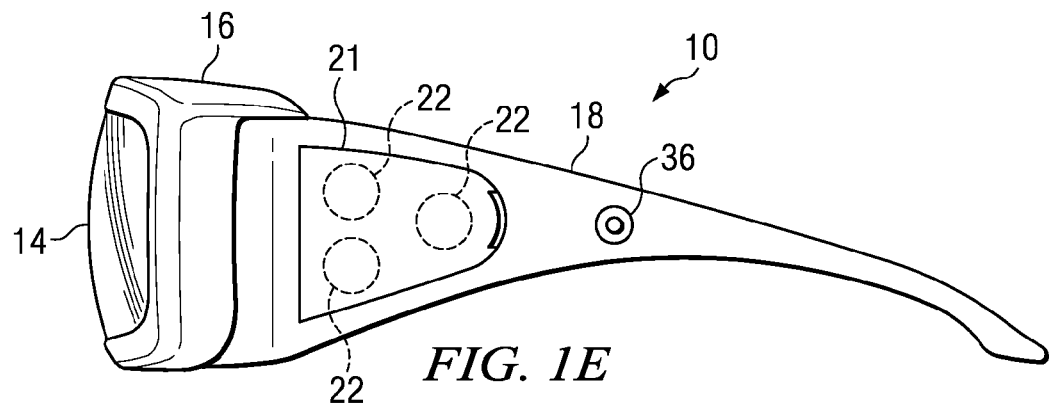

Referring to FIGS. 1D and 1E, side views of normally opened AVT eyeglasses 10 show that the electronic circuit 33 is integrated into the earpiece 20, the electronic circuit 33 being electrically attached to the light sensor 32 and to the batteries 22 contained in the battery compartment 21. The earpiece 18 also has the left control 36; the ear piece 20 also has the right control 37, the controls used in one embodiment to set the lower and the upper light level limits for electronic control of the duty cycle for maximum and minimum transmission of the light through the lens. An on/off switch may be incorporated into the earpieces 18 and 20 near the hinges 8 and 9, respectively, such that the switch is turned on when the earpieces are unfolded for wearing, supplying voltage from the battery to the electronic circuit 33. The controls 36 and 37 are a button type switch in one embodiment. In an alternative embodiment, the controls 36 and 37 may be rotatable screws connected to a potentiometer. Other embodiments include slide switches or other rotating switches as known in the art.

The placement of the controls 36 and 37 and the on/off switch may be accomplished in a variety of ways in other embodiments consistent with the invention. For example, the controls 36 and 37 may be incorporated into the earpieces in another embodiment. In yet another embodiment, the controls 36 and 37 may be constructed to make patient control more difficult such that settings are managed by a physician.

Figure 2A:
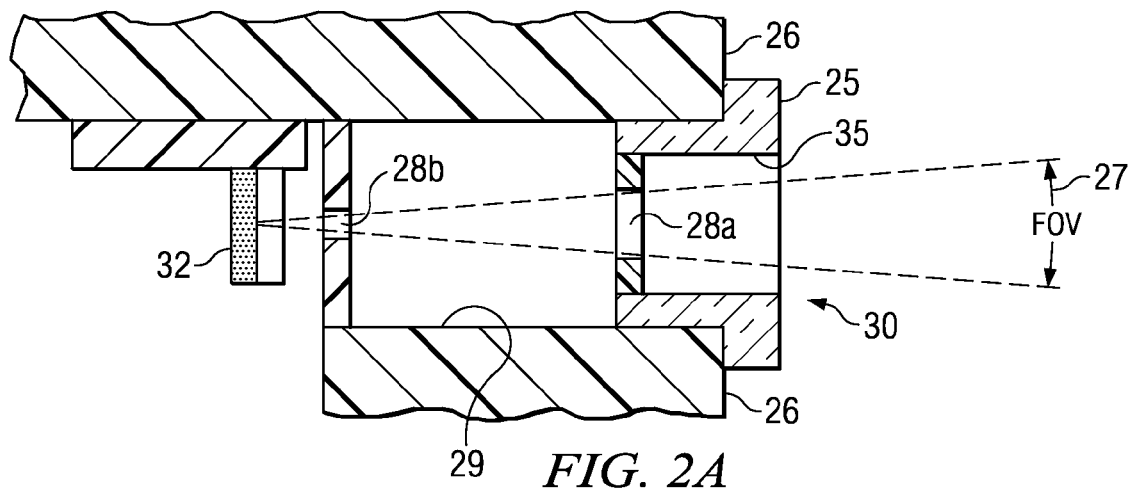
FIG. 2A is a cross-sectional view of a light plug situated in the AVT eyeglasses frame.
Figure 2B:
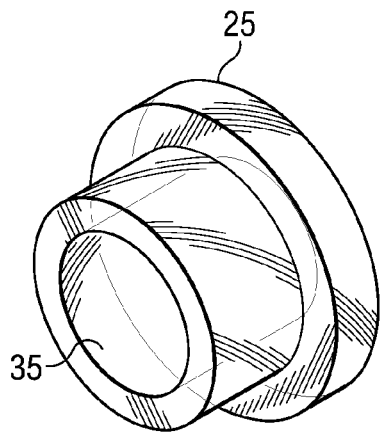
FIG. 2B is a perspective view of the light plug.
Figure 2C:
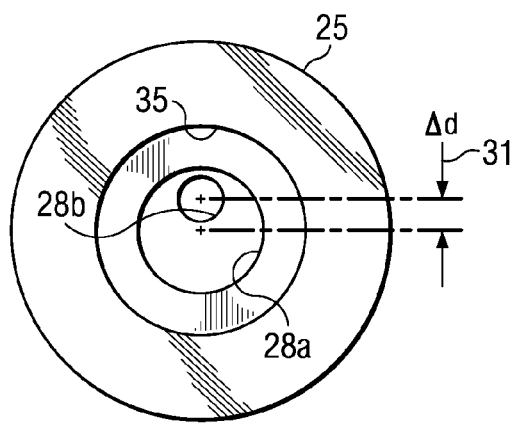
FIG. 2C is a frontal view of the light plug situated in the eyeglasses frame.

FIGS. 2A, 2B and 2C show details of the sensor element 30 that includes a hole 29 in the bridge area 26 having a clear plug 25, an output aperture 28b, and a light sensor 32 fixed behind the output aperture 28b. The clear plug 25 has a clear hole with the inner surface 35 to which an input aperture 28a is mounted as shown in FIGS. 2B and 2C. The input and the output apertures create a field of view 27 from which the light is collected onto light sensor 32 that measures the ambient light luminance collected within the field of view 27 from the front of the AVT eyeglasses 10. The output aperture 28b may have its center offset from the center of the input aperture 28a, the offset being in the vertical or the horizontal direction by an offset distance 31. A vertical offset distance 31 causes a vertical shift of the field of view while the horizontal offset distance 31 causes a horizontal shift of the field of view. The horizontal plane is defined as the plane containing the center point of both lenses. The vertical plane is a plane perpendicular to the horizontal plane for which all points are equidistant from the center point of both lenses.

Clear plugs with different fields of view and different offset distances will be available to the ophthalmologist to allow for the setting of different fields of view, a suitable clear plug being selected and inserted into the bridge area 26 as prescribed for the wearer. The geometry of the input and the output apertures may be selected to restrict light gathering capability and to set the field of view, for example the apertures may be elliptical with the major axis oriented horizontally and the minor axis oriented vertically to restrict bright light from the sun or overhead lights. One embodiment horizontal field of view is ±30° about the vertical plane. One embodiment vertical field of view is +10° upward, and −45° downward, from the horizontal plane.

Figure 2D:
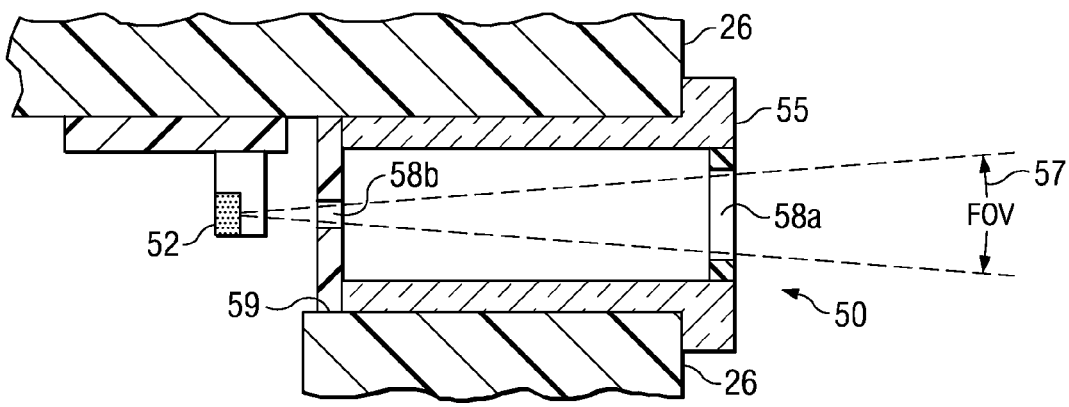
FIG. 2D is a cross-sectional view of the light pipe plug situated in the AVT eyeglasses frame.
Figure 2E:
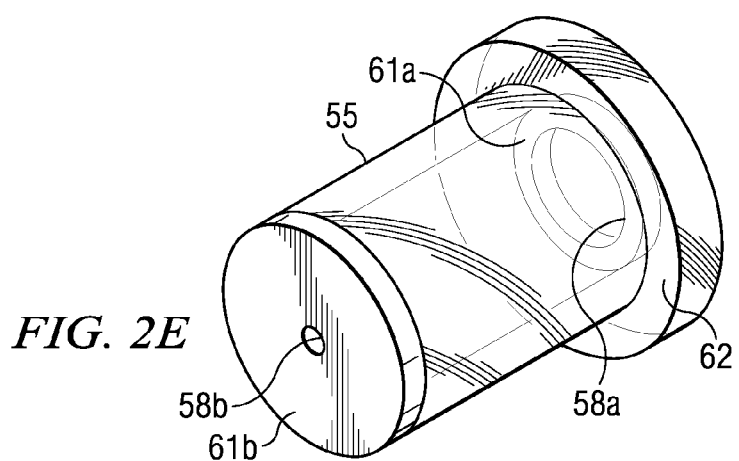
FIG. 2E is a perspective view of the light pipe plug.

FIGS. 2D and 2E show detail of an alternative embodiment of a sensor element, the sensor element 50 that includes a clear plastic light pipe 55 inserted into the hole 59 of the bridge area 26 having the input aperture 58a on a first surface 61a, the output aperture 58b on a second surface 61b and the light sensor 52. The input and the output apertures create a field of view 57 such that the light is collected onto the light sensor 52 that measures ambient light luminance collected within the field of view 57 to the front of the AVT eyeglasses 10. A shoulder 62 on the light pipe 55 abuts to the eyeglass frame 16. The input aperture 58a and the output aperture 58b may be formed by depositing metal on the surfaces 61a and 61b and etching the deposited metal to create transparent areas on both surfaces. The output aperture 58b may have its center offset from the center of the input aperture 58a, the offset being in the vertical or horizontal direction by an offset distance (not shown). As with the clear plugs 25, the light pipes with different fields of view and different offset distances may be inserted into the bridge area 26 as required for the wearer.

Figure 3A:
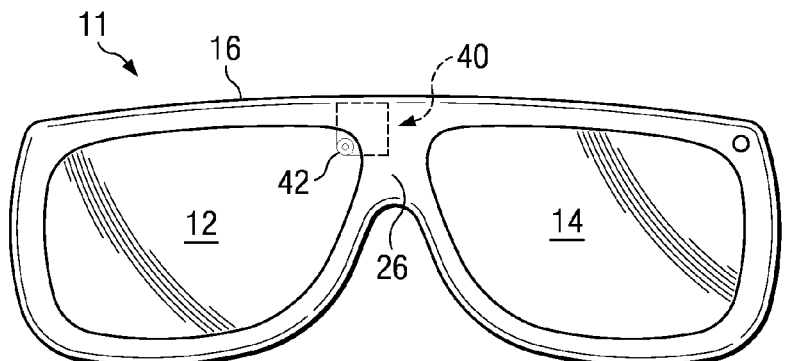
FIG. 3A is a frontal view of the second embodiment AVT eyeglasses showing the frames and the light sensor position behind the lens.
Figure 3B:
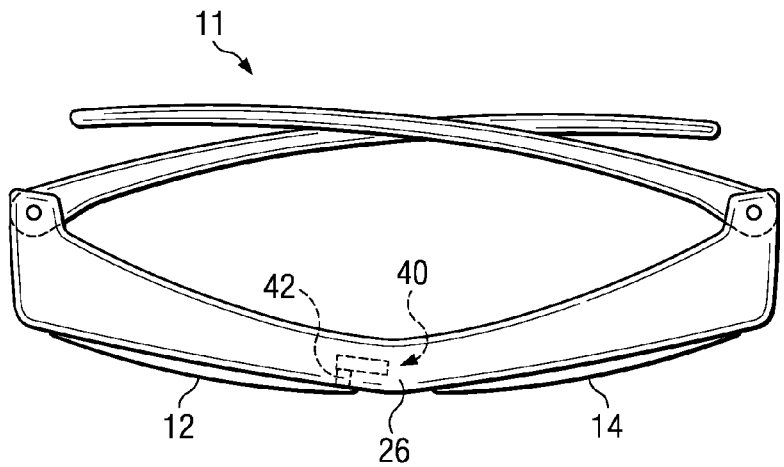
FIG. 3B is a top view of the of second embodiment AVT eyeglasses showing the frames and light sensor position behind the lens.
Figure 3C:
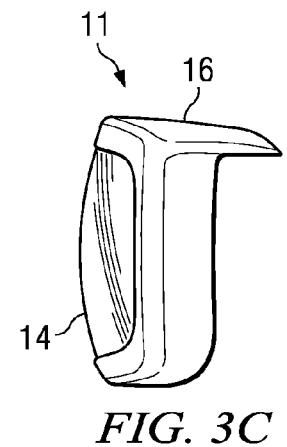
FIG. 3C is a side view of the second embodiment AVT eyeglasses.

FIGS. 3A, 3B, 3C show a second embodiment of the AVT eyeglasses 11. FIG. 3A is a frontal view of the AVT eyeglasses 11 that includes the lenses 12 and 14 mounted in the frame 16, the lenses 12 and 14 have electronically controllable optical density as in the first embodiment. The sensor element 40 is contained in the bridge area 26 of the frame 16 and has the light sensor 42. The light sensor 42 is positioned behind lens 12 such that it senses light that is transmitted through the lens 12. The AVT eyeglasses 11 also have earpieces, the electronic circuit, the controls and the battery compartment similar to those described for the AVT eyeglasses 10.

Figure 3D:
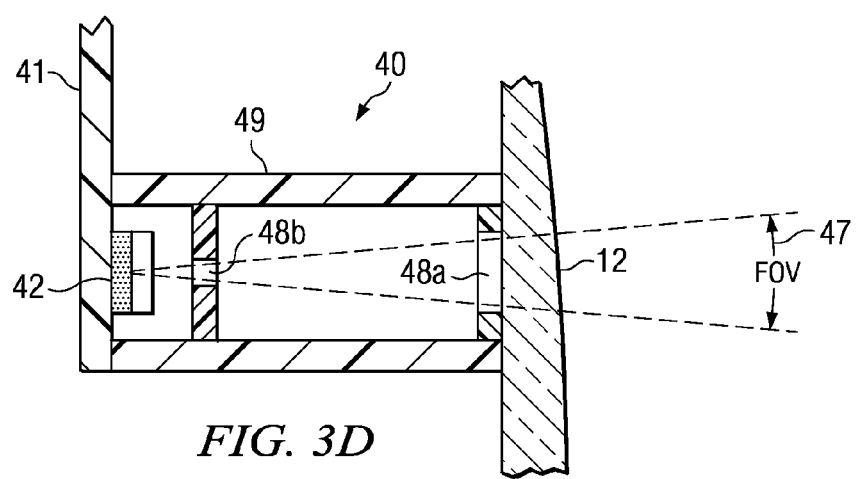
FIG. 3D is a cross-sectional view of the light pipe plug situated behind the AVT eyeglasses lens.

FIG. 3D shows detail of the sensor element 40 that includes a light pipe 49 having the input aperture 48a and the output aperture 48b, the mounting assembly 41 and the light sensor 42. The input and the output apertures create the field of view 47 from which light is collected onto the light sensor 42 that measures the luminance of light collected within the field of view 47 and transmitted through the lens 12 to the front of the AVT eyeglasses 10. The input aperture 48a and the output aperture 48b are integrated into the light pipe 49, the input aperture 48a being adjacent to the rear surface of the lens 12. As before, the input aperture 48a may be offset from the output aperture 48b to move the field of view vertically or horizontally.

Figure 4:
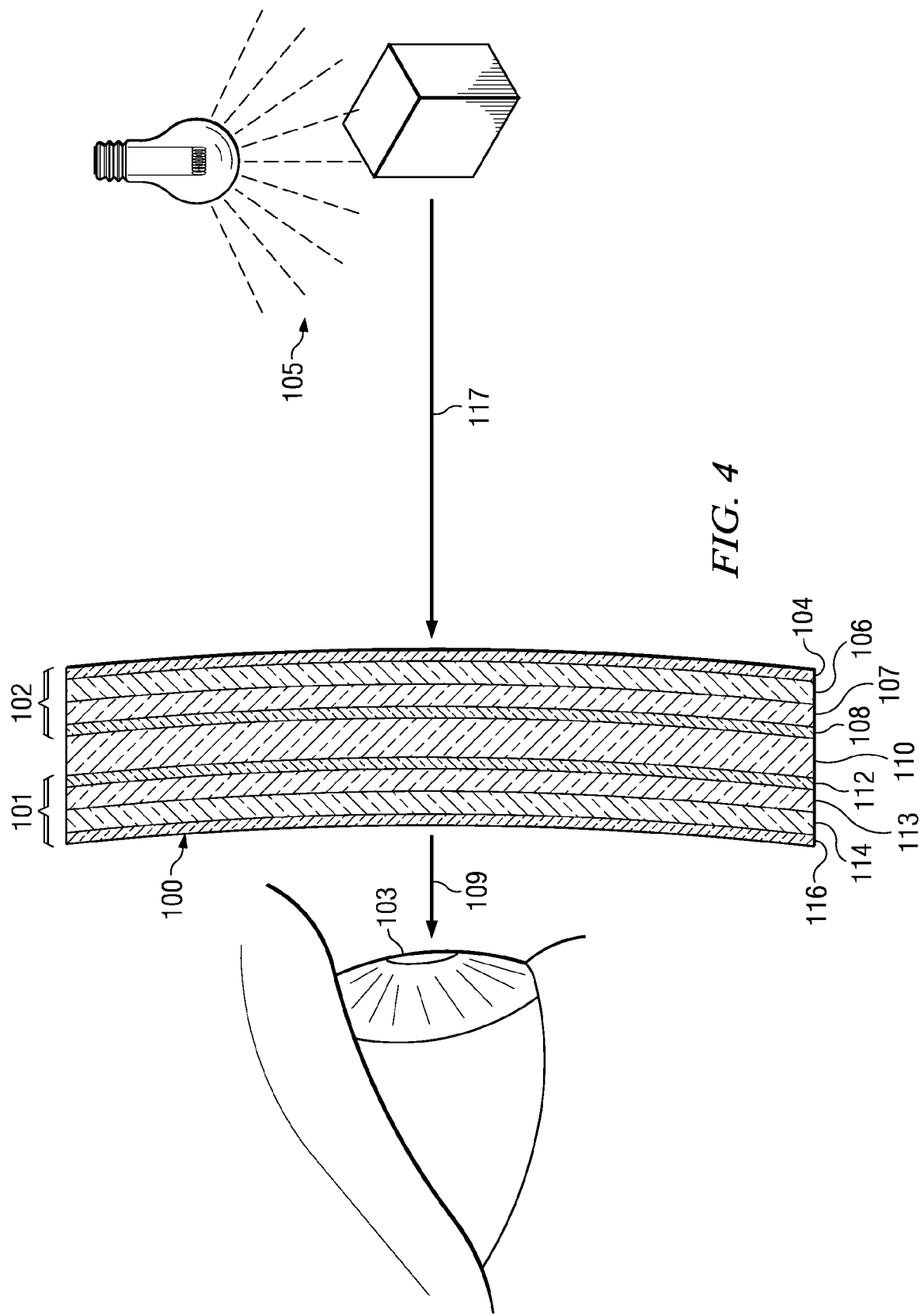
FIG. 4 is a geometric drawing of the lens structure in one embodiment of the invention.
Figure 5A:
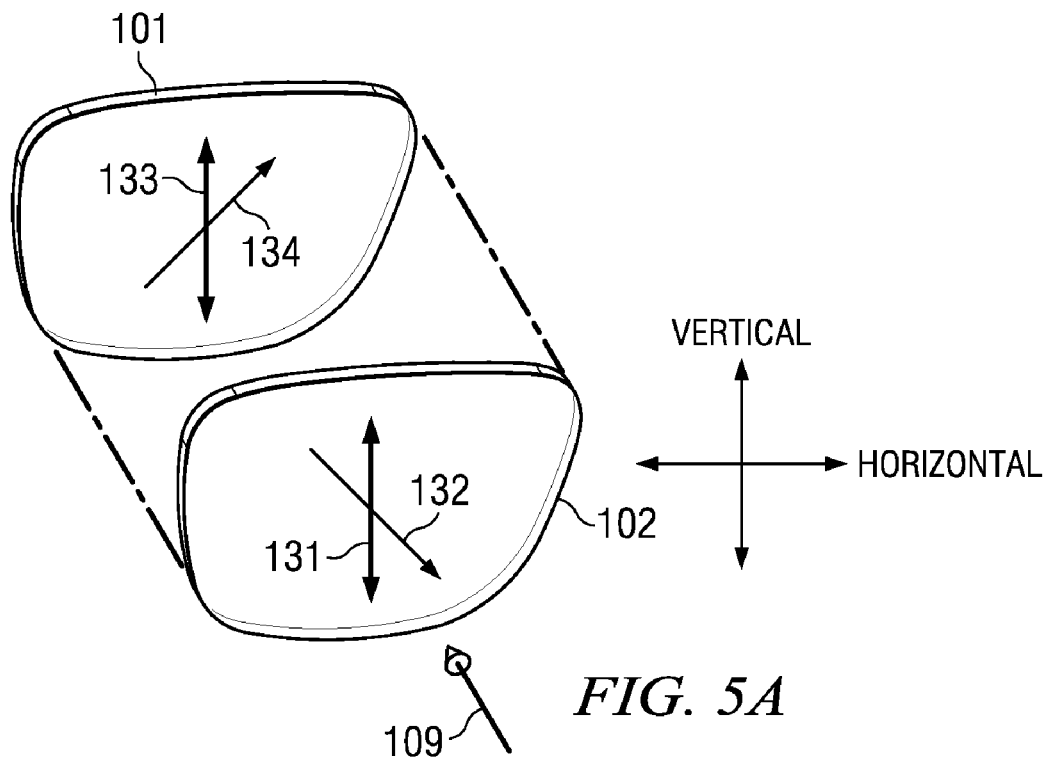
FIG. 5A is a front perspective drawing of the inner and outer lens substrates with top down view looking toward the front face of the lenses, the drawing pertaining to the fail dark lens substrate arrangement.
Figure 5B:
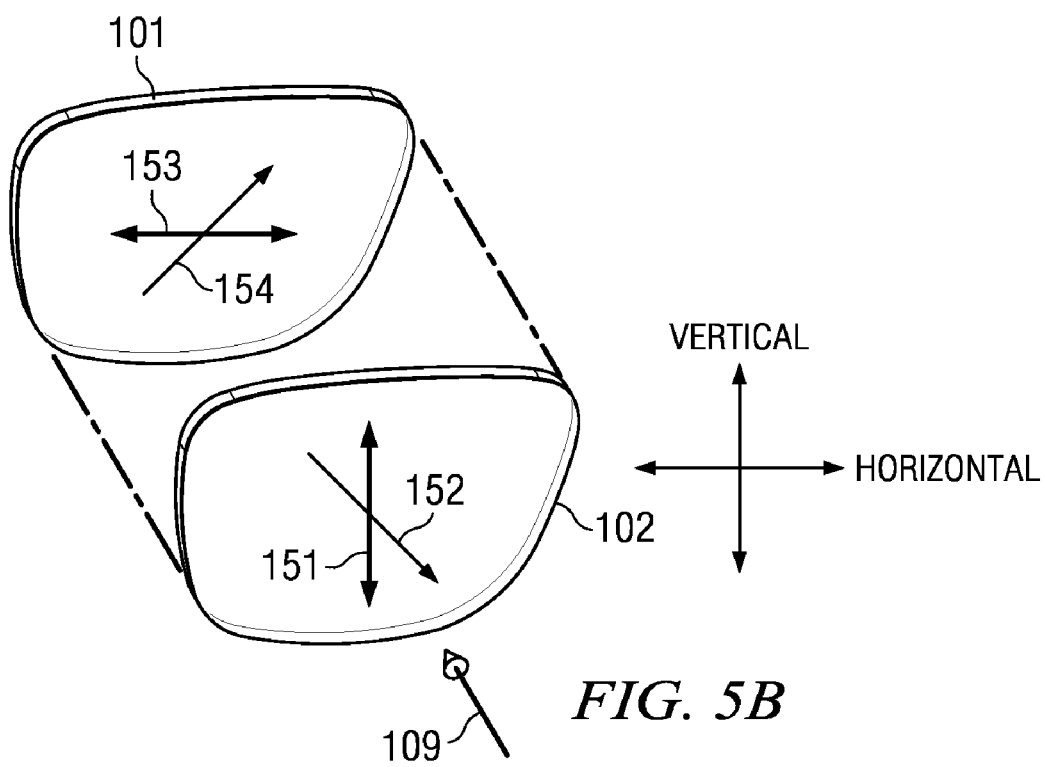
FIG. 5B is a front perspective drawing of the inner and outer lens substrates with top down view looking toward the front face of the lenses, the drawing pertaining to the fail light lens substrate arrangement.

FIGS. 4, 5A and 5B show the structure of the liquid crystal lens 100. In FIG. 4, the lens 100 corresponds to the lenses 12 and 14 of FIGS. 1-3. The lens 100 includes a twisted nematic liquid crystal material 110 sandwiched between an inner substrate 101 nearest the wearer's eye 103 and an outer substrate 102 nearest the object or the light source 105. The incident light has a direction vector 117, and the transmitted light has a direction vector 109. An outer substrate 102 includes several Layers and components. Starting from the front surface and moving toward the eye 103, an input polarizing thin film 104 is coated onto a first electrically conductive ITO glass substrate 106, the rear facing surface being coated with a first layer of ITO 107 upon which is a first thin film polyimide alignment layer 108 that is scribed in a first direction. The first polyimide alignment layer 108 is in contact with a liquid crystalline material 110. A second thin film polyimide alignment layer 112 is coated onto a second ITO layer 113 on the front facing surface of a glass substrate 114 and scribed in a second direction. A rear facing surface of glass substrate 114 is coated with an output polarizing thin film 116. As is known in the art, an electric potential is applied between the first conducting ITO glass substrate 106 and the second conducting ITO glass substrate 114 to affect the orientation of the liquid crystal and thereby change the transmissivity of the lens 100. In one embodiment, the applied electric potential is an alternating potential.

In the exemplary embodiment the polarizing film is preferably made of organic dye in base film (polyvinyl alcohol, or PVA), product number NPF Q-12 from Nitto Denko with transmittance of about 41%, polarizing efficiency of about 89%, hue (NBS-a) of −0.6 and hue (NBS-b) of 1, giving rise to a yellow lens color with no applied voltage and a dark blue lens color with applied alternating voltage. Electrical leads are attached by silver epoxy and the lens substrates are surrounded with an adhesive ring.

FIG. 5A shows a fail dark embodiment of the lens 100 such that when the electric potential is zero between the inner substrate 101 and the outer substrate 102, the lens 100 has a relatively low transmissivity. FIG. 5A is drawn such that the surfaces while looking down at the page are the front facing surfaces of the two lens substrates looking toward the wearer's eye; a further description being that a transmitted light vector 109 is going into the page in FIG. 5A. In one embodiment, the fail dark transmissivity value is approximately 6%. In other embodiments the fail dark transmissivity may achieve a relatively lower value. In the fail dark configuration, the polarizer of outer substrate 102 is arranged to transmit linear polarization in a first direction 131 and an alignment layer scribed in a second direction 132, the first direction 131 being vertical and the second direction 132 being at an angle of 45° clockwise from horizontal. Furthermore, the polarizer of the inner substrate 101 is arranged to transmit linear polarization in a third direction 133 and alignment layer scribed in a fourth direction 134, the third direction 133 being vertical and the fourth direction 134 being 45° counterclockwise from horizontal.

FIG. 5B shows a fail light embodiment of the lens 100 wherein when the electric potential is zero between the inner substrate 101 and the outer substrate 102, the lens 100 has a relatively high transmissivity. FIG. 5B is drawn similar to FIG. 5A such that the transmitted light vector 109 is going into the page. In the alternative embodiment, the fail light transmissivity value is approximately 30%. In other embodiments, the fail light transmissivity may be higher. In the fail light configuration the polarizer of the outer substrate 102 is arranged to transmit linear polarization in a fifth direction 151 and alignment layer scribed in a sixth direction 152, the fifth direction 151 being vertical and the sixth direction 152 being 45° clockwise from the horizontal direction. Furthermore, the polarizer of the inner substrate 101 is arranged to transmit linear polarization in a seventh direction 153 and alignment layer scribed in an eighth direction 754, the seventh direction 153 being horizontal and the eight direction 154 being 45° counterclockwise from the horizontal direction.

Figure 6:
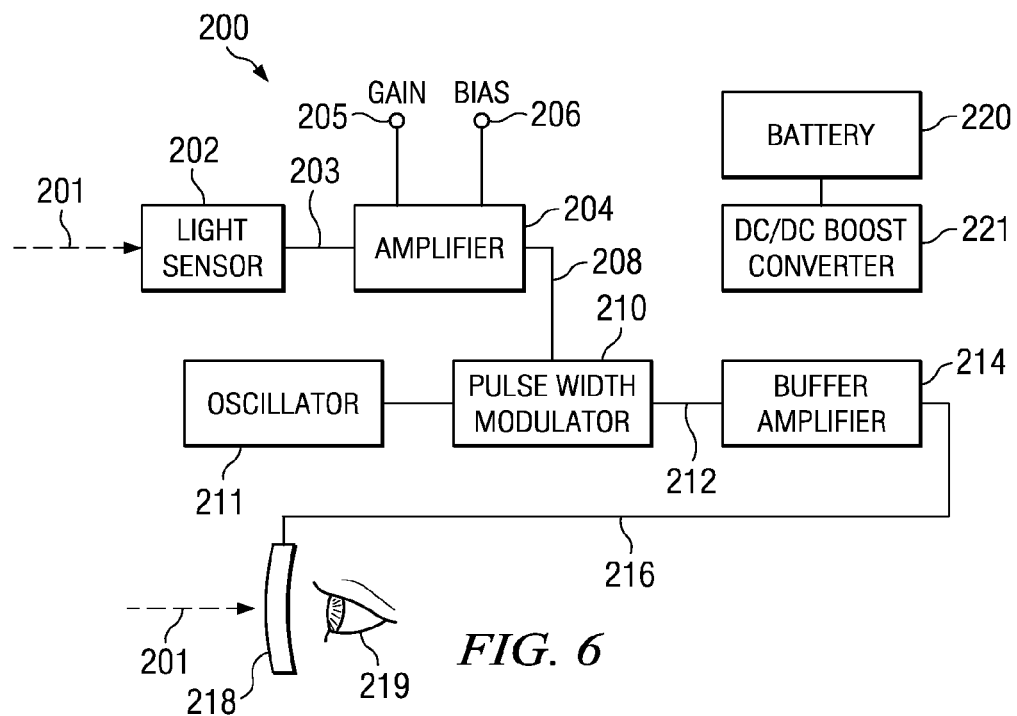
FIG. 6 is a block diagram of the electronic circuitry for the AVT glasses with direct ambient light photosensing.

FIG. 6 is a block diagram of a first embodiment electronic circuit 200. An electronic circuit 200 provides electronic control of the transmissivity of a lens element 218 allowing for a certain fraction of an incident light 201 to fall on a wearer's eye 219 and includes a DC/DC boost converter 221 connected to a battery 220; a light sensor 202; an amplifier 204 connected to the light sensor 202, the amplifier 204 having a gain control 205 and a bias control 206; a pulse width modulator 210 connected to the amplifier 204; an oscillator 211 driving the frequency and timing of the pulse width modulator 210; a buffer amplifier 214 connected to lens element 218 for conditioning a drive signal 216 to drive lens element 218, the input of buffer amplifier 214 connected to the pulse width modulator 210, generating a pulse-width modulation (PWM) signal 212. The incident light 201 that is directly from the ambient light, falls on the light sensor 202 where the detected light quanta are converted to a photocurrent 203. The photocurrent 203 is sensed by the amplifier 204 and converted to a photovoltage 208. The gain between the photovoltage 208 and the photocurrent 203 is set by the gain control 205 and a voltage offset being set by the bias control 206. In one embodiment, the gain control 205 and the bias control 206 are factory set. The photovoltage 208 determines the duty cycle of the PWM signal 212. In this exemplary embodiment, the PWM 210 is a 555 timer chip operating in PWM mode as known in the art, with the photovoltage 208 driving the 555 timer's control voltage input. The amplifiers 204 and 214 may be inverting or non-inverting types so as to generate an appropriate PWM control voltage for a fail light mode of operation or a fail dark mode of operation, respectively. The duty cycle varies from about 5% to about 50%.

Figure 7:
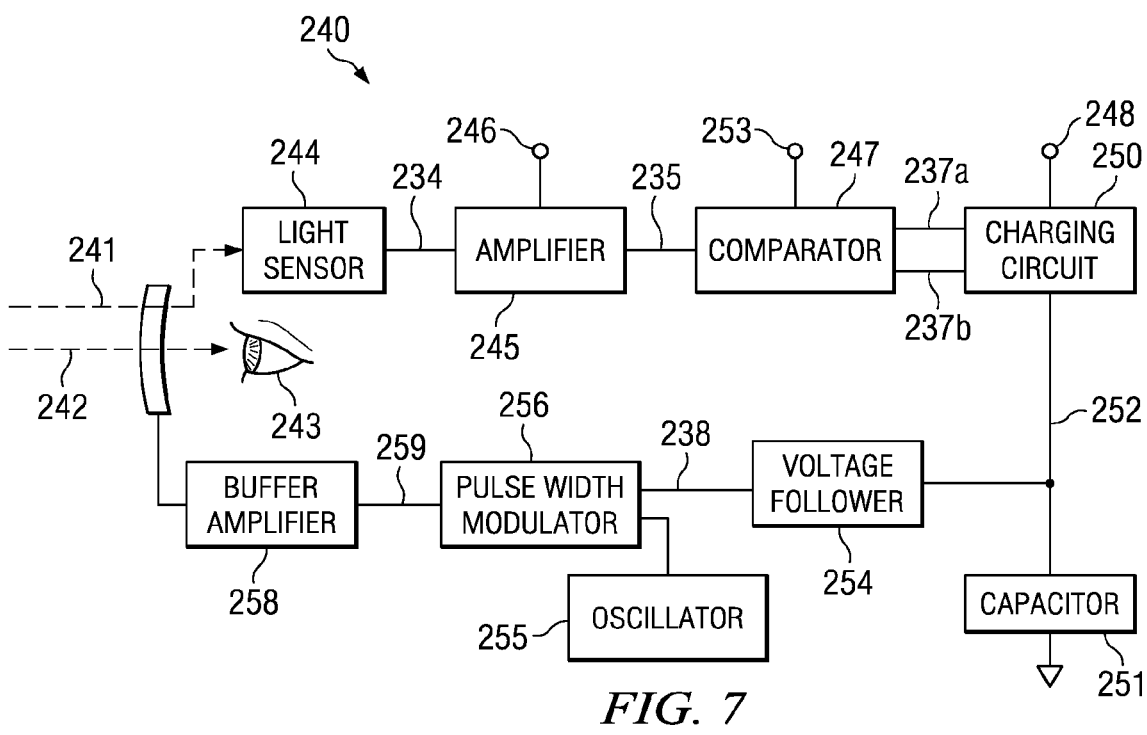
FIG. 7 is a block diagram of the electronic circuitry for the AVT glasses with photosensing from behind the lens.

FIG. 7 is a block diagram of a second embodiment an electronic circuit 240. The electronic circuit 240 provides electronic control of the transmissivity of a lens element 242 allowing for a certain fraction of an incident light 241 to fall on a wearer's eye 243 and includes a light sensor 244 generating a photocurrent 234; an integrating transimpedance amplifier 245 connected to the light sensor 244 having sensitivity control 246 and an output photovoltage signal 235 proportional to the photocurrent 234. The electronic circuit 240 further includes a comparator 247 with a voltage reference 253; a charging circuit 250 connected to a capacitor 251 for charging the capacitor 251 having a peak voltage reference 248, a voltage follower 254 connected to the capacitor 251 and the charging circuit 250; a pulse width modulator circuit 256 connected to the output of a voltage follower 254 and driven by an oscillator 255, and a buffer amplifier 258 connected to a PWM circuit 256 and to the lens element 242 for the driving lens element 242. The PWM circuit 256 produces a PWM signal 259 of variable duty cycle and fixed period, the period being determined by the oscillator 255.

The photovoltage signal 235 is connected to the input of the comparator 247 that enables a charging signal 237a or a discharging signal 237b depending upon a comparison between the photovoltage signal 235 and the reference voltage 253. If the photovoltage signal is less than the reference voltage, then the charge signal 237a is enabled and the charging circuit 250 allows the capacitor 251 to be charged to a capacitor voltage 252 determined by the peak voltage reference 248. If the photovoltage signal is greater than the reference voltage, then the discharge signal 237b is enabled and charging circuit 250 discharges capacitor 251 causing the capacitor voltage 252 to go to ground. If the photovoltage signal is approximately the same as the reference voltage, then neither of the signals 237a or 237b are enabled and the capacitor voltage 252 is not altered except for circuit leakages.

A voltage follower 254 creates the current buffered PWM input voltage 238 proportional to the capacitor voltage 252, the PWM input voltage 238 determining the duty cycle of the PWM signal 259. The PWM circuit 256 is connected to the buffer amplifier 258, that in turn drives the lens element. The PWM circuit 256 may be a 555 timer chip operating in the PWM mode as known in the art, with the PWM input voltage 238 driving the 555 timer's control voltage input. The duty cycle varies from about 5% to about 50%.

Figure 8:
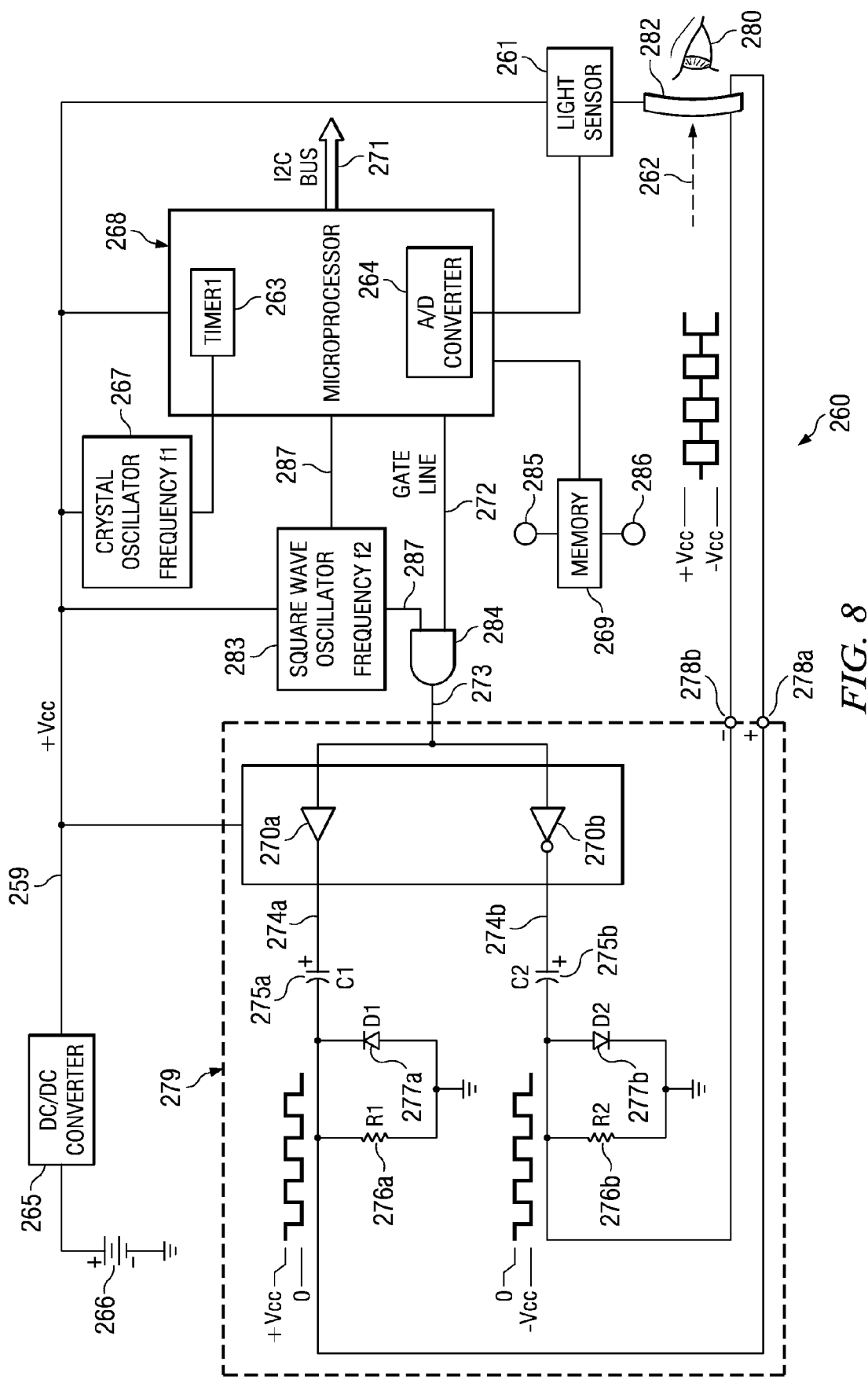
FIG. 8 is a block diagram of the electronic circuitry for the AVT glasses with direct ambient light photosensing and using a microprocessor for control in one embodiment.

FIG. 8 is a block diagram of a third embodiment electronic circuit 260. An electronic circuit 260 provides electronic control of the transmissivity of a lens element 282 allowing for a certain fraction of an incident light 262 to fall on a wearer's eye 280 and includes a DC/DC converter 265 connected to a battery 266 and having an output DC voltage Vcc 259 for powering the components of the circuit 260; a light sensor 261 for sensing an incident light 262; a crystal oscillator 267 oscillating at a frequency f1; a square wave oscillator 283 oscillating at a frequency f2 producing a square wave signal 287 connected to a microprocessor 268 and an AND gate 284; the microprocessor 268 having an A/D converter 264 connected to the light sensor 261 and a timer 263 connected to the crystal oscillator 267, the microprocessor 268 further having a memory 269 that contains program instructions 285 for operation and for generating a pulse width modulated signal; and a serial interface 271 for communications with the microprocessor 268.

The electronic circuit 260 also has a charge pump circuit 279 for generating an alternating current drive signal and further contains the AND gate 284 with one input being the square wave signal 287 and a second input being a GATE line 272 that is connected to and driven by the microprocessor 268. The output of the AND gate 284 is a PWM signal 273 that is connected to a charge pump circuit 279.

The charge pump circuit 279 includes a non-inverting buffer 270a and an inverting buffer 270b, a set of polarized capacitors 275a and 275b; a set of resistors 276a and 276b; and a set of diodes 277a and 277b. Both buffers having their inputs tied to the PWM signal 273. The capacitor 275a has its negative side connected to the non-inverting output 274a of the buffer 270a and its positive side connected to the cathode of a diode 277a, to first end of a resistor 276a and to an output line 278a. The anode of the diode 277a and the second end of the resistor 276a are tied to ground. The capacitor 275b has its positive side connected to the inverting output 274b of the buffer 270b and its negative side connected to the anode of the diode 277b, to a first end of the resistor 276b and to the output line 278b. The cathode of the diode 277b and the second end of the resistor 276b are tied to ground. The voltage across the output lines 278a and 278b alternates between zero and twice Vcc.

In another embodiment of the electronic circuit 260, the AND gate may be synthesized in the program logic contained in program instructions and the GATE line 272 becomes equivalent to the PWM signal 273.

In operation, the incident light 262 falls on the light sensor 261 wherein the detected light quanta are converted to photocurrent and then to a photovoltage proportional thereto. The photovoltage is read by the A/D converter 264 in conjunction with the microprocessor 268 to determine a measured incident light luminance that is used according to the program instructions 285 to the drive GATE line 27z that sets the duty cycle of the PWM signal 273. Besides the program instructions 285, the microprocessor 268 has stored in the memory 269 the parameters 286 including at least an upper transmissivity limit, T_max, a relatively lower transmissivity limit, T_min, and incident light levels L1 and L2, associated to the transmissivity limits. In one embodiment, T_min and T_max are predetermined such that the electronic circuit 260 is calibrated during manufacture to produce T_min at about 50% PWM signal duty cycle and T_max at about 5% duty cycle. T_max is typically 29% transmissivity and T_mm is typically 6% transmissivity. The program instructions 285 will be described according to the discussion of FIG. 10 below.

The microprocessor 268 has a serial interface 271 for downloading the program instructions 285 and the parameters 286. The serial interface 271 may be wired or it may be wireless as in a Bluetooth transmitter and receiver. In one embodiment, the serial interface 271 is of type $I^2C$ and the microprocessor 268 is the MP430 ultra relatively low power MCU commercially available from Texas Instruments, Inc, of Dallas, Tex.

The third embodiment electronic circuit 260 has advantages in several aspects: it is easily programmable on the ophthalmologist's bench with the patient, upgradeable to include new features, and suitable for cost effective manufacturability wherein the upgraded features may include different lens structures with different transfer. The electronic circuit 260 may be operated in a direct view mode or in a transmitted light mode. In the transmitted light mode consistent with the second embodiment AVT eyeglasses 11, the microprocessor 268 is programmed to keep the transmitted light through the lens constant at a prescribed illumination using PID feedback control algorithms known in the art. The direct view mode consistent with the first embodiment AVT eyeglasses 10, the microprocessor 268 is programmed to produce a lens transmissivity for a given input light level.

Figure 9:
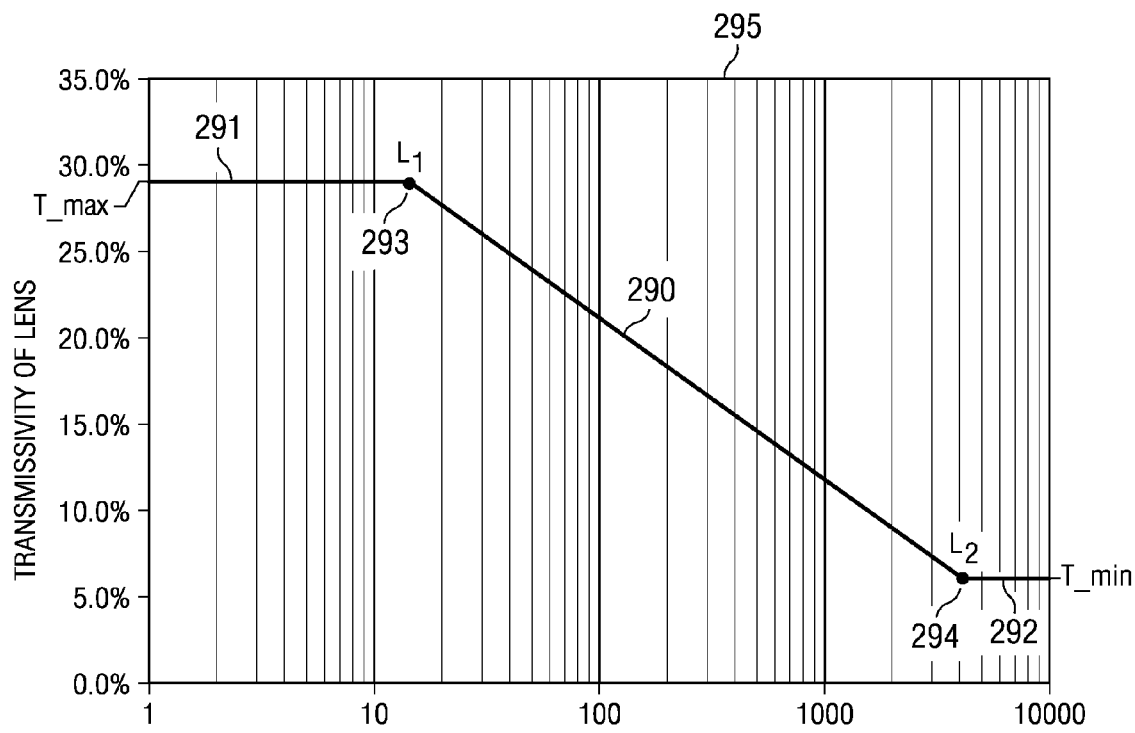
FIG. 9 is a graph of AVT glasses transmittance curves showing one embodiment transmissivity curve.

FIG. 9 is a graph of a typical transmittance function 295 employed for the direct view mode AVT eyeglasses 10. The abscissa is the ambient light luminance measured in $cd/m^2$ (L_in) and the ordinate is the transmissivity through the lenses 12 and 14, the transmissivity being the fraction of light transmitted through the lens. The transmittance function 295 is typical of a fail dark mode of operation and includes three regions, the controlled region 290, the fully powered transmittance region 291, and the powered off transmittance region 292. The fully powered transmittance region 291 transitions to the controlled region 290 at an ambient light luminance of L1 corresponding to the point 293 on the transmittance curve. The controlled region 290 transitions to the powered off transmittance region 292 at luminance L2 corresponding to the point 294 on the transmittance curve.

In one embodiment, the transmittance function for the controlled region 290 takes the form of the Weber-Fechner logarithmic response law. The transmittance function 295 is summarized according to the formula:

$$T = \begin{cases} T_{max} & L_i \le L_1 \\ a\log L_i + b & L_1 < L_i < L_2 \\ T_{min} & L_i \ge L_2 \end{cases},$$

wherein $T * L_i$ is the transmitted light level (luminance on the eye), $L_i$ is the ambient light level (luminance on the lens), $T_{max}$ is the maximum transmittance of the lenses 12 and 14, $T_{min}$ is the minimum transmittance of the lenses 12 and 14, and the coefficients a and b are fit according to $$a = \frac{T_{min}L_2 - T_{max}L_1}{\log L_2 - \log L_1}, \quad b = T_{max}L_1 - a\log L_1.$$

The Weber-Fechner law is known in the art to most closely approximates a human sensory response function, however, other embodiments are conceived wherein other functions may be used, for example a linear response.

Figure 10:
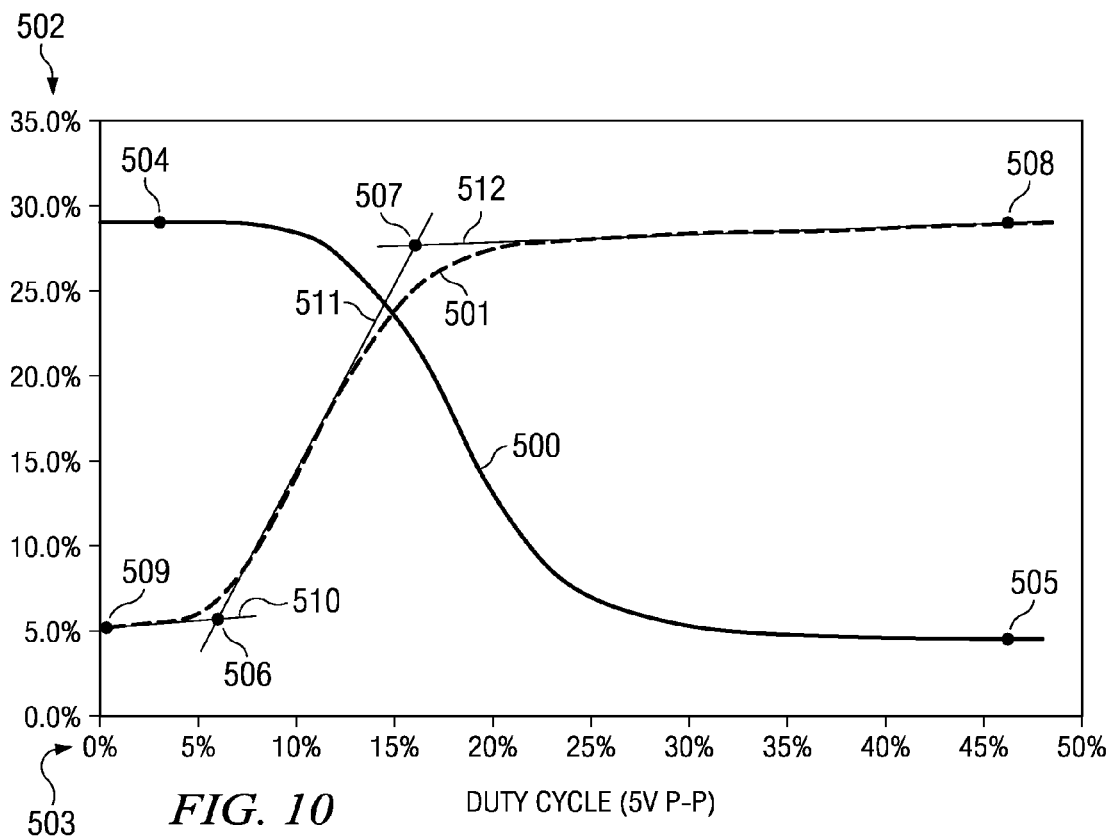
FIG. 10 is a graph showing the liquid crystal response curve of transmissivity versus duty cycle in one embodiment of the invention, curves for fail dark and fail light modes are shown.

The graph of FIG. 10 shows the two exemplary liquid crystal response curves, a fail light mode response curve 500 and a fail dark mode response curve 501, both curves having duty cycle as an abscissa 503 and transmittance T as an ordinate 502. For a given lens assembly, the transmittance will take on a fixed maximum and a fixed minimum. In the fail light case according to the curve 500, a maximum transmittance point 504, occurs for small duty cycle and a minimum transmittance point 505, occurs near the point of maximum duty cycle, the maximum duty cycle being 50% in the exemplary embodiment. In the fail dark case according to the curve 501, the maximum transmittance point 508, occurs near the maximum duty cycle and the minimum transmittance point 509, occurs for small duty cycle. An AVT lens system operating in fail light mode will have maximum transmittance and maximum light on a wearer's eye when the voltage across the lens goes to zero. An AVT lens system operating in fail dark mode will have minimum transmittance and minimum light on a wearer's eye when the voltage across the lens goes to zero. One mode of operation is to fail dark for the invention, but either mode may be used.

In practice, the fail dark curve 501 is used to compute a required duty cycle for a given transmittance. To simplify and speed up the computation, the fail dark curve 501 is approximated by three linear functions separated by the transition points 506 and 507, the first linear function 510 being defined between the point 509 and the transition point 506, the second linear function 511 being defined between the transition point 506 and the transition point 507, and a third linear function 512 being defined between the transition point 507 and the point 508. In one embodiment, the transition point 506 occurs at about 6% duty cycle and 5.5% transmissivity; the transition point 506 occurs at about 16% duty cycle and 27.5% transmissivity. The transition points and linear fit parameters are typically stored in the memory 269 within the set of parameters 286.

Figure 16:
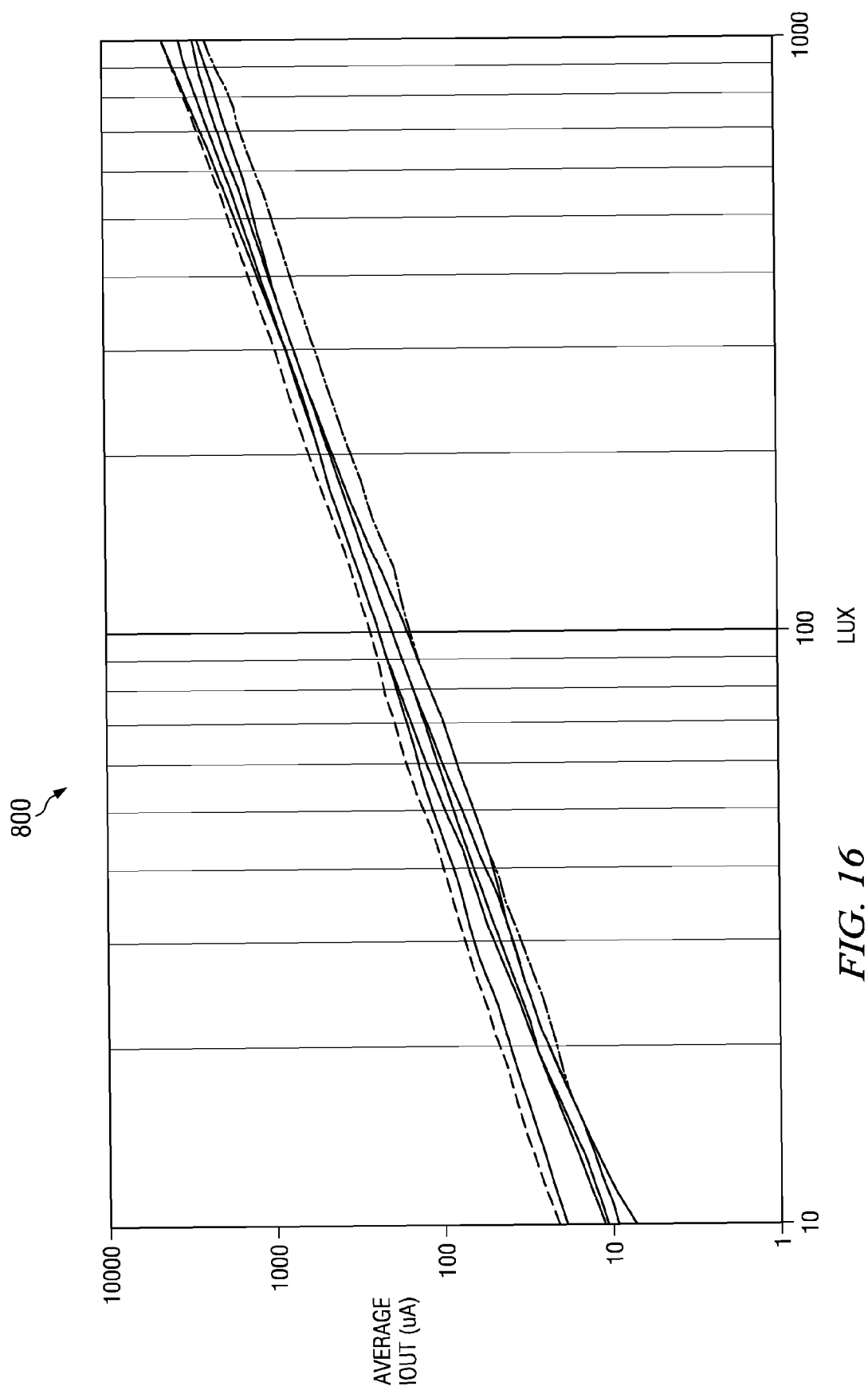
FIG. 16 is a graph of a typical light sensor response.

A sensor response curve relating incident light level Li to measured photocurrent of the light sensor is required. A typical sensor response curve 800 is shown in FIG. 16. In practice, the sensor response is approximately linear and the slope of the sensor response curve 800 is typically stored in the memory 269 as one of the set of parameters 286.

Figures 15, 17:
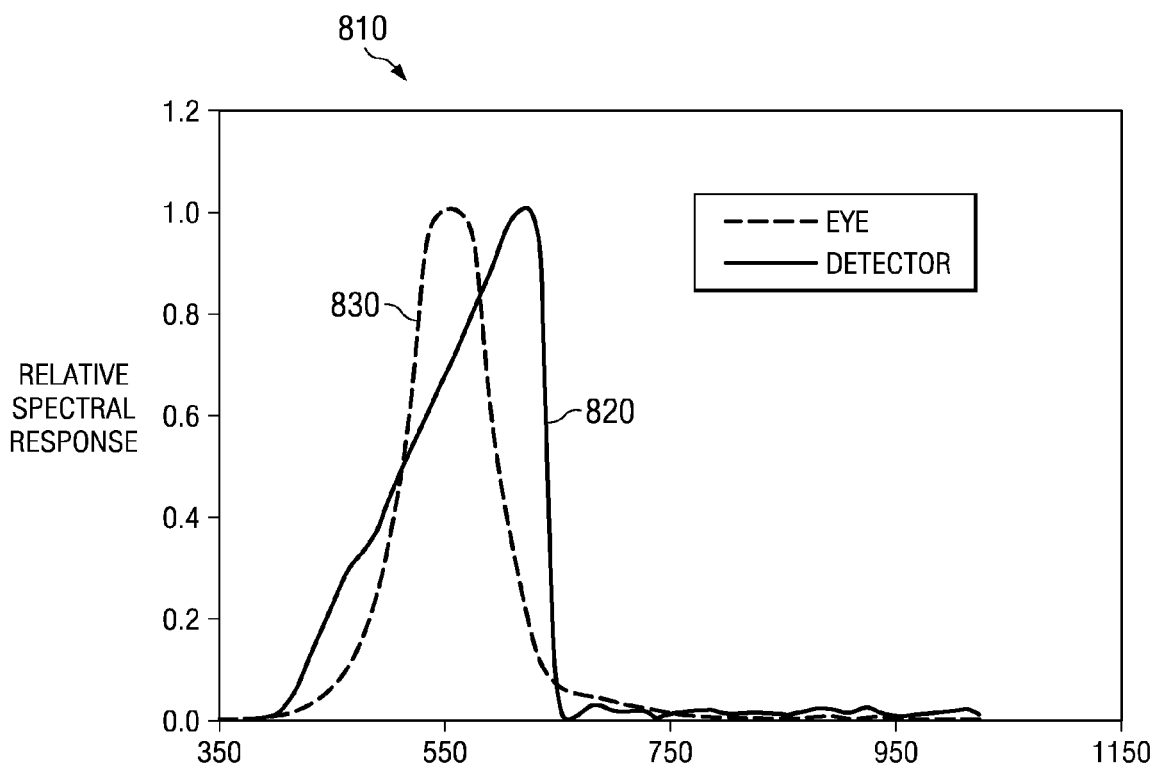
FIG. 15 is a graphical depiction of the display page of the physician's program.
FIG. 17 is a graph of a typical light sensor spectral response.

A useful feature of the AVT eyeglasses 10 is that the spectral response of the sensor approximate the response of the human eye. FIG. 17 shows a graph 810 of a typical spectral response, the spectral response curve 820 being reasonably close to the response of the human eye 830. In one embodiment using direct detection of ambient light, the light sensors 202, 244, and 261 are part APDS-9003 from Avago Technologies Corporation and the graphs of FIGS. 16 and 17 are taken from the corresponding data sheet.

Referring again to FIGS. 9 and 10, in operation, the desired transmittance T is computed from the overall transmittance response function 295 for a given ambient light level Li and then the duty cycle D for the desired transmittance T is derived from liquid crystal response curve 500 to control the transmissivity of the lenses 12 and 14. For ambient light illumination less than L1 falling on the AVT eyeglasses 10, the lenses 12 and 14 are turned off transmitting light at a constant maximum lens transmittance, T_max. For ambient light illumination greater than L2 falling on the AVT eyeglasses 10, the lenses 12 and 14 operate at their minimum transmittance, T_min, the lens control generally being limited by duty cycle or by polarization efficiency of the inner and the outer lens substrates.

A useful feature of certain embodiments of the invention is the ability of the wearer to set the point 293 and the point 294 of the transmittance curve 295, although the AVT eyeglasses are typically set by a trained ophthalmologist in the clinic using a computer interfaced to the eyeglasses. The point 293 may be adjusted by pressing and holding the left control 36 momentarily in one embodiment wherein the wearer may accomplish setting the light level L1 to the current ambient light level. Point 293 is then (L1, $T_{max}$*L1). The point 294 may be adjusted by pressing and holding the right button 37 momentarily in one embodiment, wherein the wearer may accomplish setting the light level L2 to the current ambient light level. The point 294 is then (L2, $T_{min}$*L2), When the point 294 is changed, the extent and the slope of the controlled region 290 of the transmittance curve are adjusted to a new extent and a new slope. For example, before adjustment the point 294 may be (4000, 240); after adjustment the point 294 may become (5000, 300). Alternative embodiments may restrict either the L1 or the L2 adjustment by a wearer.

Also in one embodiment, if both the left and the right controls 36 and 37 are pressed and held simultaneously, the AVT eyeglasses 10 resets to default values for the points 293 and 294. Other embodiments may be envisioned wherein the setting of the points 293 and 294 is physically accomplished by other means, the invention not being limited to left and right controls to set the points 293 and 294.

FIG. 11 is a pseudocode listing of a control program 300 executed by the microprocessor 268 as the program instructions 285 and controlling the various functions of the AVT glasses. FIGS. 8, 9 and 10 are also useful to understanding the operation of the control program 300. The control program 300 has a first hardware interrupt procedure 302, a second hardware interrupt procedure 315, a software interrupt procedure 306 executed at microprocessor boot up, a "Run" procedure 308 that executes the main loop of the program, and three subroutines 320, 325 and 327 that perform computational functions as explained below. The A/D converter 264 is read to measure photodetector voltage referred to as photovoltage below. Timer1 is the internal timer 263 of the microprocessor 268.

The microprocessor 268 can monitor and respond to hardware interrupts, redirecting program flow accordingly. A first hardware interrupt procedure 302 is triggered by an interrupt created by attempted communications on the serial interface 271. The code associated with the hardware interrupt procedure 302 allows parameters to be entered externally and stored in the memory 269. In the control program 300, only one parameter, the minimum ambient light level L_min is entered in units of cd/m^2, otherwise the default value is selected. In one embodiment the default L_min is in the range of 5 to 40 cd/m^2 and typically set to 15 cd/m^2.

A second hardware interrupt procedure 315 is triggered by an interrupt created when one of the controls 36 and 37 is pressed and held for a predetermined time. The first interrupt service 316 associated to the left control 36 measures the photovoltage at the time of the interrupt and sets the variable L1 to the ambient light luminance corresponding to the measured photovoltage. A second interrupt service 317 associated to the right control 37 measures the photovoltage at the time of the interrupt and sets the variable L2 to the ambient light luminance corresponding to the measured photovoltage. The interrupt procedure 315 also services the situation wherein both the left and the right buttons are pressed simultaneously in the third service interrupt 318 that sets L1 and L2 to default values, the default values having been stored in the set of the parameters 286. In an alternative embodiment L1 and L2 refer directly to photovoltage generated from the light sensor 261 without converting to luminance.

A software interrupt procedure 306 occurs shortly after the electronics are powered, the software interrupt procedure 306 functioning to initialize the hardware and the variables required for the remainder of the control program 300. The variables are initialized according to values stored in the memory 269 and include T_min, T_max, detector response alpha, ratio beta that is the ratio of frequencies f1/f2, duty cycle coefficient gamma, minimum light level L1, maximum light level L2, and linear fit parameters for the liquid crystal response: T1, T2, a1, b1, a2, b2, a3, b3, D_min and D_max, and count2 that determines the PWM pulse width. Additionally, the Gate line 272 is set to 0 (zero) V and timer1 is reset to zero count. When the initialization is complete the software interrupt procedure 306 begins to run "Run" procedure 308.

The program 300 generates the PWM signal 273 according to a "Run" procedure 308 wherein the GATE line 272 is made to go high for a time proportional to count2 and made to go low for the remainder of the period of a square wave signal 287. The "Run" procedure 308 continuously executes a loop labeled loop1 in FIG. 11 until the eyeglasses are powered off or a hardware interrupt occurs.

A first "if structure" 310 is checked each time loop1 repeats and executes a set of instructions if a transition from a relatively low to high voltage level of the square wave signal 287 is detected by the microprocessor. The set of instructions in the first "if structure" 310 begin by starting timer1 to counting, then the photovoltage is measured and converted to an ambient light luminance value L_in and the GATE line is then set to Vcc. The transmissivity T is then computed for L_in by calling a subroutine 320 after which the required duty cycle of the PWM signal 273 to obtain transmissivity T is calculated by calling the subroutine 325. Once the duty cycle DC is calculated, count2 is computed as count2=DC*beta, count2 determining the positive pulse width in the PWM signal 273. The control program 300 limits the slew rate of the PWM signal 273 according to the value of gamma in a second "if structure" 311.

The "Run" procedure includes a third "if structure" 312 that is checked each time loop1 repeats. The third "if structure" 312 compares timer1 with count2. If enough time has elapsed such that timer1 has developed a count greater than count2 then GATE line is set to 0 V and timer1 is reset to zero count.

A transmissivity subroutine 320 returns transmissivity T according to the transmittance curve 295 of FIG. 9 wherein T=T_max if L_in is less than L1, T=T_min if L_in is greater than L2, otherwise T is given by the transmissivity function $$T=a*\log(L\_in)+b.$$

The slope and the intercept b are computed by a Coefficients subroutine 327 that fits the transmissivity function to the points (L1, T_max) and (L2, T_min).

A DutyCycle subroutine 325 returns a computed duty cycle value D for a given transmissivity T. The Duty cycle subroutine 325 uses the linear fit parameters associated to linear functions 510, 511 and 512 described according to the liquid crystal response graph of FIG. 10. T1 and T2 are the transmissivities at the points 506 and 507 of the liquid crystal response graph. D_min is the minimum duty cycle allowed and D_max is the maximum duty cycle allowed, having typical values of 5% and 50%, respectively. For T<T1, D is that the maximum of the value given by the linear function 510 or D_min; for T>T2, D is the minimum of the value given by the linear function 512 or D_max; otherwise D is the value given by the linear function 511.

Figure 12A:
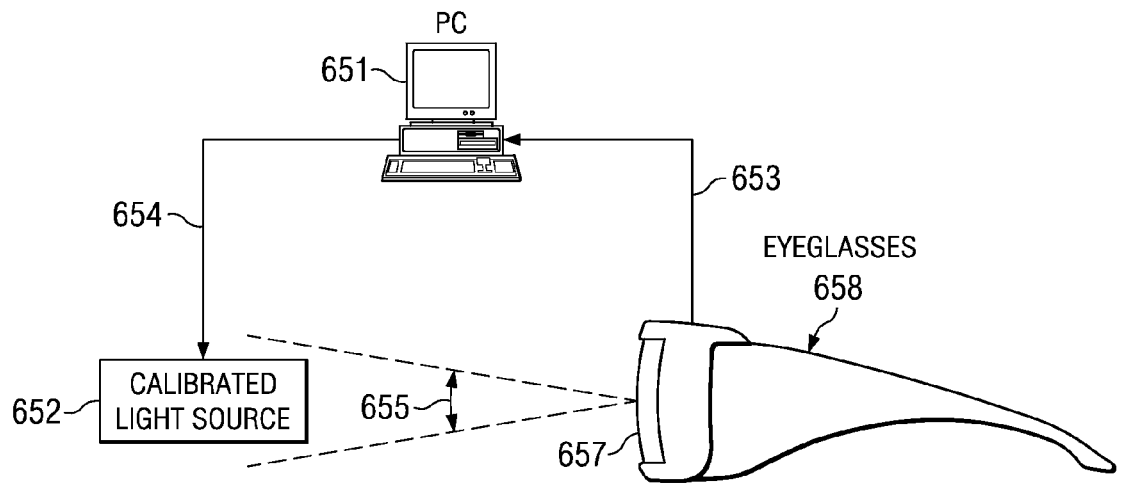
FIG. 12A is block diagram of an apparatus to calibrate the light sensor of the eyeglasses.
Figure 12B:
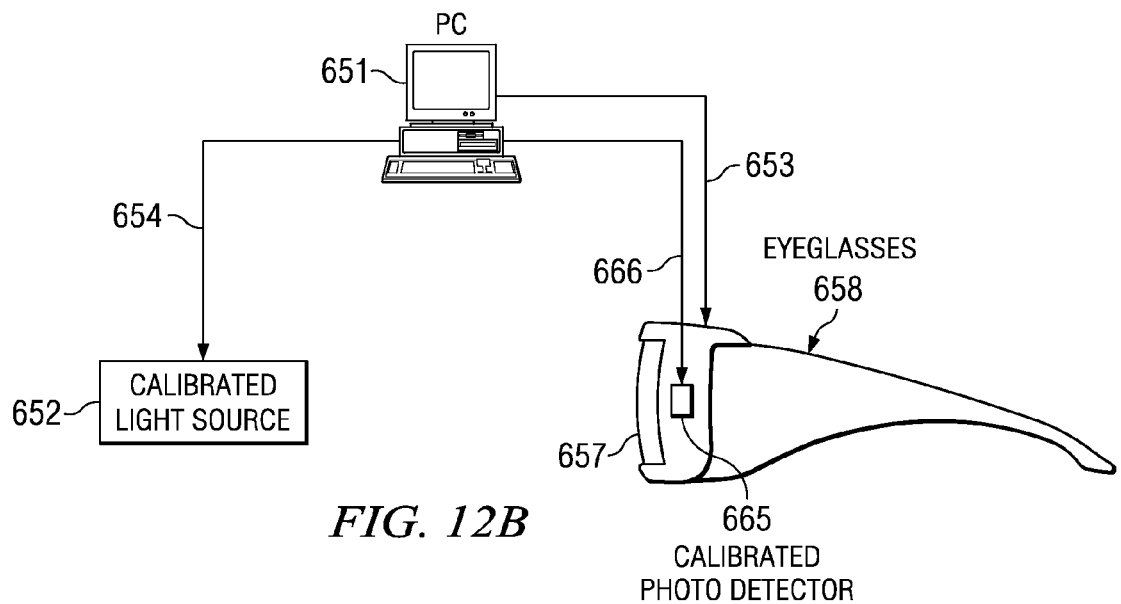
FIG. 12B is a block diagram of an apparatus to calibrate the transmissivity of the eyeglass lenses.
Figure 13:
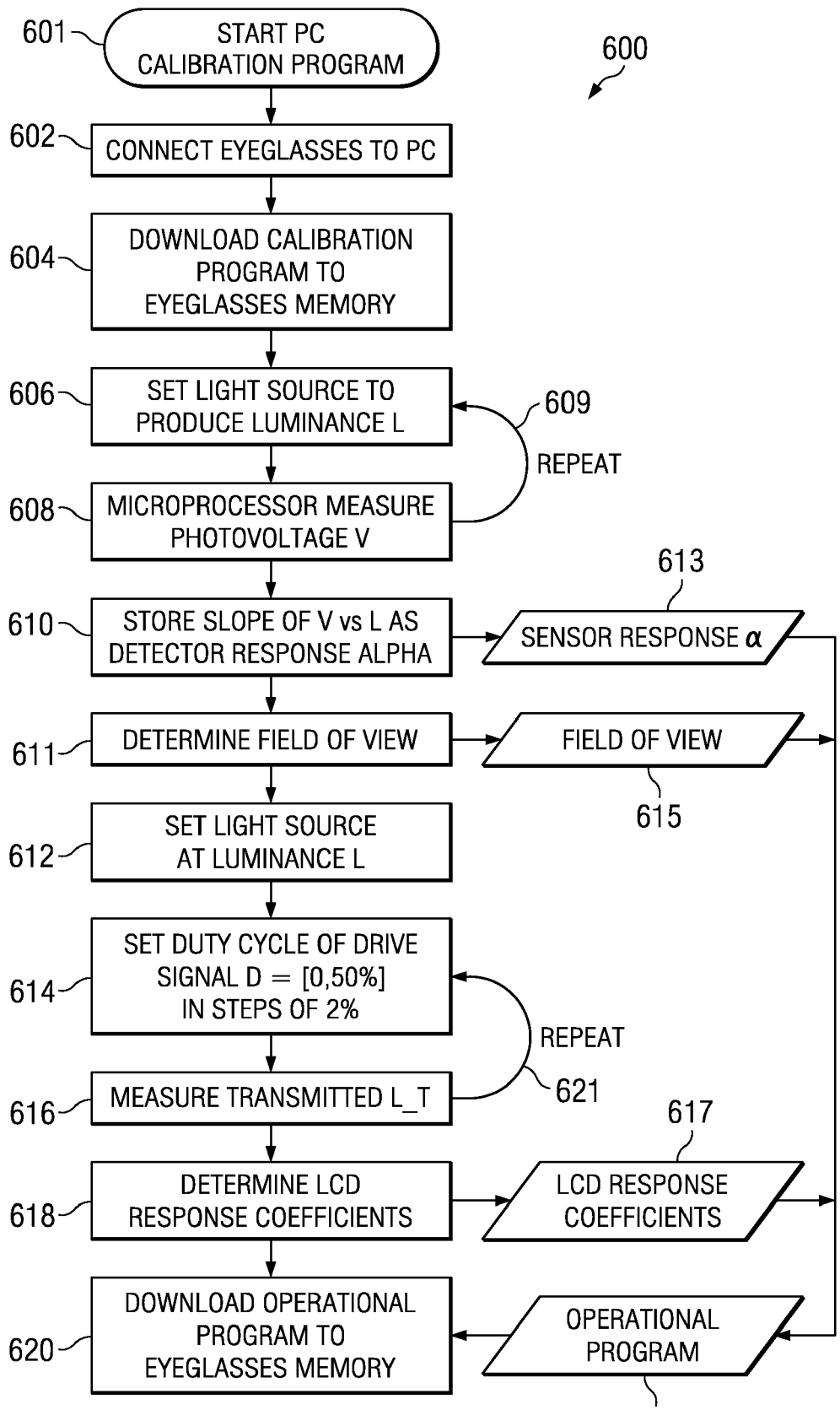
FIG. 13 is a flow chart of one method to calibrate the AVT eyeglasses.

The calibration of eyeglasses 10 is accomplished according to apparatus configurations shown in FIGS. 12A and 12B and according to the method shown in FIG. 13. The calibration method is suitable for the eyeglasses using the digital electronic circuit 260 or similar. Similar calibration methods are conceived for the analog electronic circuits 200 and 240.

In FIG. 12A a first calibration configuration 650 for measuring light sensor response is shown. A computer 651 has an interface 654 to a calibrated light source 652, the interface 654 allowing for automatic programming of the luminant intensity of the light source 652. The light source 652 is typically a diffuse source similar to Model RS-5 light source from Gamma Scientific corporation. The lenses 657 held within eyeglasses 658 are positioned to face the light source. A serial interface 653 is connected between the computer 651 and the eyeglasses 658 for reporting photovoltages measured by the light sensor of the eyeglasses. The light source may be moved laterally such that the field of view 655 of the light sensor on the eyeglasses may be determined.

FIG. 12B shows a second calibration configuration 660 suitable for calibrating the transmissivity of the eyeglasses 658. The computer 651 has an interface 654 to the calibrated light source 652, the interface 654 allowing for automatic programming of the luminant intensity of the light source 652. The lenses 657 held within the eyeglasses 658 are positioned to face the light source. A serial interface 653 is connected between the computer 651 and the eyeglasses for programming the duty cycle of the PWM drive voltage for the lenses 657 therein. A calibrated photodetector 665 is placed behind the eyeglass lens facing the calibrated light source 652 and made to detect light from the light source as transmitted through the lens, the calibrated photodetector 665 connected to the computer 651 by a computer interface 666. The computer has a program that can vary the duty cycle of the lenses 657 and for each duty cycle, download the corresponding measured light intensity from the calibrated photodetector 665. The values can be stored according to patient and product number for future reference.

FIG. 13 is a flowchart of a calibration method 600 used in conjunction with the first and the second calibration configurations. The method begins in the step 601 wherein the PC calibration program is made to run on the computer 651. The eyeglasses are also connected by the interface 653 to the computer 651 in step 602, the eyeglasses having the electronic circuit 260 therein. A calibration program is downloaded to the memory of the eyeglasses in step 604 using the interface 653. The calibration program contains program instructions to be executed by the microprocessor 268 to measure and communicate the photovoltage V from the eyeglasses light sensor. The calibration program also contains program instructions for accepting instructions via the interface 653 to set the duty cycle of PWM signal that is the driving lenses 657.

In step 606, the computer 651 sets the light source 652 to a first predetermined intensity L and then in step 608 the microprocessor 268 measures first photovoltage V corresponding to the light detected by the eyeglasses. Steps 606 and 608 are repeated in the loop 609 for at least second and third predetermined intensities and for second and third measured voltages. In step 610 the slope of measured voltage V versus light intensity L is determined and stored as the eyeglasses light sensor response 613.

Step 611 is performed next, wherein the light source 652 is moved horizontally to determine the horizontal field of view of the eyeglasses light sensor and then moved vertically to determine the vertical field of view of the eyeglasses light sensor. While the moving light source 652, the photovoltage is measured and reported by the microprocessor and displayed on the computer. Typically, the position of the light source and the measured photovoltage is recorded by hand. The photovoltage falls off with position determining the edges of the field of view that is calculated according to the geometry of the apparatus. The field of view 615 is stored in the computer 651 for later download to the eyeglasses.

After the light sensor is calibrated in steps 606 through 611, the liquid crystal lens is calibrated in steps 612 through 618. Beginning with step 612, the computer 651 sets the light source 652 to a predetermined intensity L_i. The computer 651 then in step 614 sends the eyeglasses a set of duty cycles between 0% and 50%, preferably in steps of 2%. In step 616, the computer measures the transmitted light through the lens. Steps 614 and 616 are repeated for each duty cycle in the set according to the loop 621. The transmitted light level L_t is measured by the calibrated photodetector 665, the measured values of L_t being communicated to the computer 651. In step 618 the liquid crystal response curve similar to the curve 501 of FIG. 10 is determined for duty cycle versus transmissivity T, wherein T=L_t/L_i and fit coefficients for three regions of operation are determined for the linear functions 510, 511 and 512. Also, T_max and T_min are determined whereby T_max is the maximum transmissivity T measured and T_min is the minimum transmissivity T measured. The values for T_max, T_min, and the three slopes and intercepts for the linear function 510, 511 and 512 are stored as the liquid crystal response coefficients 617. The method does not preclude using more than three regions and more than three linear functions, nor does it preclude fitting a more complex function to the liquid crystal response curve.

In another embodiment, the set of data points (Tk, Dk), measured in the loop 621 for a set of k duty cycles, are stored in the eyeglasses as an liquid crystal response lookup table. To use the lookup table, the DutyCycle subroutine 325 is replaced with a different subroutine that performs the following steps to look up a duty cycle D0 for a given input transmissivity T0: in the first step, looking up two T values in the lookup table nearest T0 in value, T1 and T2; then, looking up the duty cycles D1 and D2 corresponding to T1 and T2; interpolating between (T1, D1) and (T2, D2) to compute D0; and returning D0 to the calling program.

In step 620 the calibration process concludes when the liquid crystal response coefficients 617, the field of view 615 and the sensor response 613 are stored into an operational program 619 that is further downloaded into the eyeglasses memory for normal operation. The operational program 619 is similar to the eyeglasses program 300 described previously.

Figure 14:
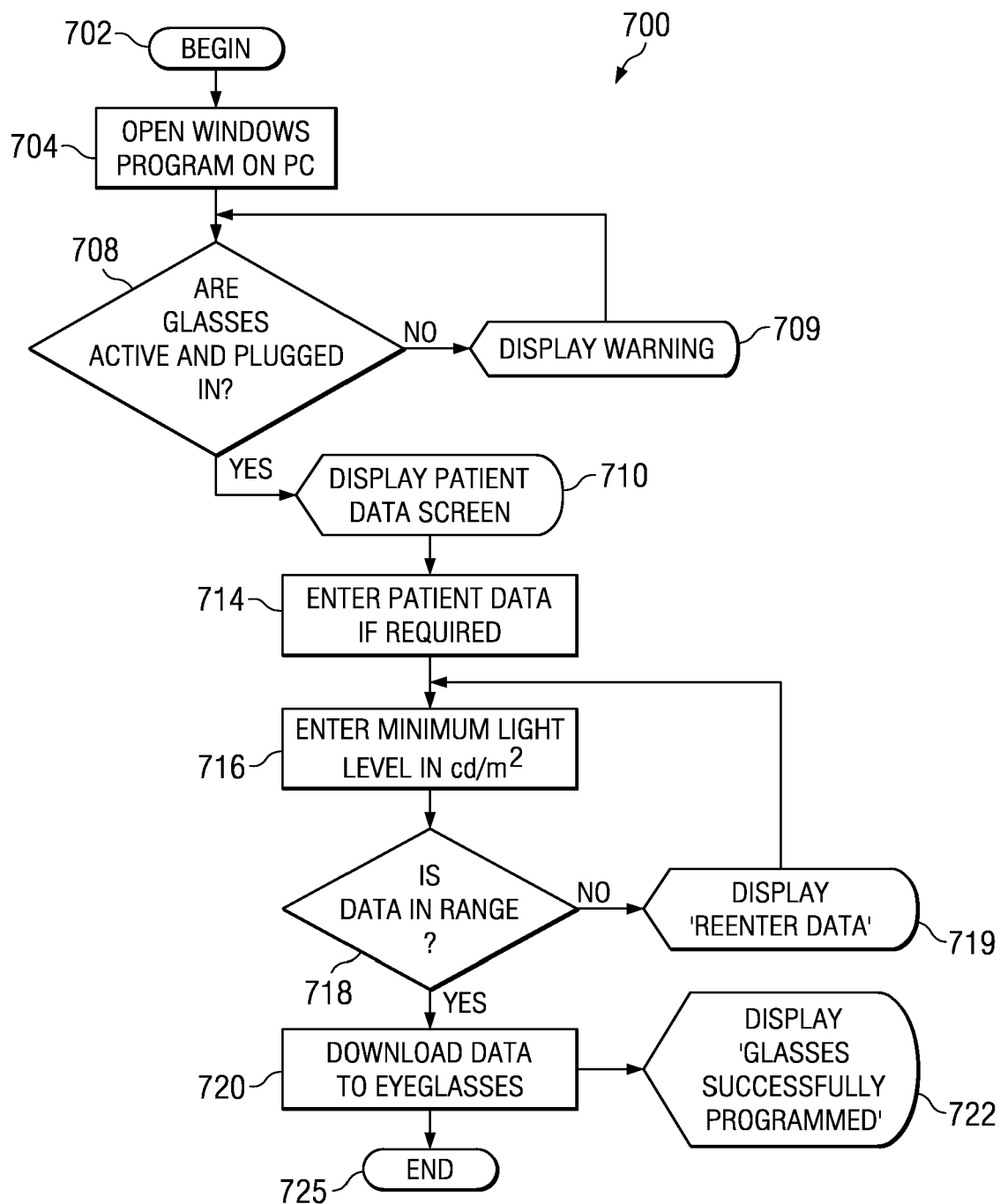
FIG. 14 is a flow chart of a physician's program.

As shown in FIG. 14, a physicians program 700 is conceived for use alongside the eyeglasses 10, the physicians program being operated on a personal computer normally situated in the physician's office in proximity to the patient for which the eyeglasses are intended for use. The physicians program is initiated in step 702 that causes a Microsoft Windows program to operate in step 704. The Windows program checks that the eyeglasses are connected to the computer in step 708 and that the eyeglasses are running a valid operational program; if not, then a warning that the eyeglasses are not ready is displayed by the computer in step 709. If the eyeglasses are connected to the computer and running a valid operational program, then a patient data screen is displayed in step 710. The physician then enters the patient data in step 714 and a desired lower light level L_min in units of cd/m$^2$ in step 716. The physicians program 700 then checks if the light level is in the proper range, that is typically [0.1, 500] cd/m$^2$. If no value is entered, a default value of 15 cd/m$^2$ is chosen in one embodiment. If outside the proper range, then a prompt to reenter the data is displayed on the computer in step 719. If the light level is in range, then the patient data and the light level is downloaded to the eyeglasses in step 720 and a message to the effect that the eyeglasses have been successfully programmed is displayed in step 722. The physician's program ends at step 725 by exiting the program.

In step 714, L_min is preferably the light level where the eyeglasses are set to achieve maximum transmissivity. Alternative embodiments are conceived for capturing different patient requirements. The physician's method may also be applied to eyeglasses with analog electronics wherein L_mm is set by a rotatable screw control.

FIG. 15 shows a typical physician's computer form display associated to the physician's program 700, the display fields being a patient name 750, a patient street address 751, a patient city address 752, a patient state 753, a patient zip code 754, a date of service 755 and the minimum light level 760.

The eyeglasses 10 along with the circuit 260 are considerably flexible in application due to programmability. Other embodiments may be conceived to take advantage of the programmability as a result. For example, different battery types may be accommodated by extending the program of the interrupt procedure 302 to enter a battery type and then the corresponding battery voltage taken into account in computing duty cycles.

Those skilled in the art to which the invention relates will appreciate that other and further additions, deletions, substitutions and modifications may be made to the described embodiments without departing from the scope of the invention.

What is claimed is:

1. Eyeglasses, comprising:
   a frame having earpieces coupled thereto;
   liquid crystal lenses coupled to the frame and configured to assume a transmissivity in response to a lens control signal;
   a light sensor coupled to the frame and configured to sense light in a field of view and produce a sensor signal in response thereto;
   a light plug coupled to the frame and configured to define the field of view; and an electronic circuit coupled to the frame and configured to employ the sensor signal to generate the lens control signal.

2. The eyeglasses as recited in claim 1 wherein the earpieces are rotatably attached to either side of the frame.

3. The eyeglasses as recited in claim 1 wherein the light sensor is a photoelectric light sensor.

4. The eyeglasses as recited in claim 1 wherein the light sensor is integrated into the frame so as to sense ambient light to the front of the eyeglasses.

5. The eyeglasses as recited in claim 1 wherein the light plug has at least two apertures positionally arranged to define the field of view in a horizontal plane and in a vertical plane, the horizontal plane containing center points of the lenses, and the vertical plane being perpendicular to the horizontal plane.

6. The eyeglasses as recited in claim 1 wherein the electronic circuit is further configured to convert the sensor signal to a pulse-width modulated signal having a proportional duty cycle and generate the lens control signal from the pulse-width modulated signal.

7. The eyeglasses as recited in claim 1 further comprising at least one battery configured to power the electronic circuit and the lenses.

8. The eyeglasses as recited in claim 1 further comprising a battery compartment in the frame.

9. The eyeglasses as recited in claim 1 further comprising an on/off switch coupled to the electronic circuit.

10. The eyeglasses as recited in claim 1 wherein the lenses each include a first glass substrate, a second glass substrate, and a liquid crystal material sealed therebetween; the first glass substrate having a first surface coated with an input polarizing film, a second surface coated with a first metal layer of indium tin oxide, and a first alignment layer coated over the first metal layer, the second glass substrate having a third surface coated with an output polarizing film, a fourth surface coated with a second metal layer of indium tin oxide, and a second alignment layer coated over the second metal layer, the first glass substrate and the second glass substrate being oriented such that the first alignment layer faces the second alignment layer, the lens signal being applied between the first metal layer and the second metal layer.

11. The eyeglasses as recited in claim 1, wherein the electronic circuit is configured to adjustably control a transmissivity response curve of the lens in response to end-user input.

12. The eyeglasses as recited in claim 11, wherein the end-user is a wearer of the eyeglasses or a physician of a wearer of the eyeglasses.

13. A method of manufacturing eyeglasses, comprising:
forming a frame having earpieces coupled thereto;
coupling liquid crystal lenses to the frame, the lenses configured to assume a transmissivity in response to a lens control signal;
coupling a light sensor to the frame, the light sensor configured to sense light in a field of view and produce a sensor signal in response thereto;
coupling a light plug to the frame, the light plug configured to define the field of view; and
coupling an electronic circuit to the frame, the lenses and the light sensor, the electronic circuit configured to employ the sensor signal to generate the lens control signal.

14. The method as recited in claim 13 wherein the forming comprises rotatably attaching earpieces to either side of the frame.

15. The method as recited in claim 13 wherein the light sensor is a photoelectric light sensor.

16. The method as recited in claim 13 wherein the coupling the light sensor comprises integrated the light sensor into the frame so as to sense ambient light to the front of the eyeglasses.

17. The method as recited in claim 13 wherein the light plug has at least two apertures positionally arranged to define the field of view in a horizontal plane and in a vertical plane, the horizontal plane containing center points of the lenses, and the vertical plane being perpendicular to the horizontal plane.

18. The method as recited in claim 13 wherein the electronic circuit is further configured to convert the sensor signal to a pulse-width modulated signal having a proportional duty cycle and generate the lens control signal from the pulse-width modulated signal.

19. The method as recited in claim 13 further comprising providing at least one battery configured to power the electronic circuit and the lenses.

20. The method as recited in claim 13 further comprising a forming battery compartment in the frame.

21. The method as recited in claim 13 further comprising coupling an on/off switch to the electronic circuit.

22. The method as recited in claim 13 wherein the lenses each include a first glass substrate, a second glass substrate, and a liquid crystal material sealed therebetween; the first glass substrate having a first surface coated with an input polarizing film, a second surface coated with a first metal layer of indium tin oxide, and a first alignment layer coated over the first metal layer, the second glass substrate having a third surface coated with an output polarizing film, a fourth surface coated with a second metal layer of indium tin oxide, and a second alignment layer coated over the second metal layer, the first glass substrate and the second glass substrate being oriented such that the first alignment layer faces the second alignment layer, the lens signal being applied between the first metal layer and the second metal layer.

23. Eyeglasses, comprising:
a frame having earpieces rotatably coupled thereto;
liquid crystal lenses coupled to the frame and configured to assume a transmissivity in response to a lens control voltage signal;
a light sensor coupled to the frame and configured to sense light in a field of view forward of the eyeglasses and produce a sensor current signal in response thereto;
a light plug coupled to the frame and configured to define the field of view relative to the lenses, the light plug having at least two apertures positionally arranged to define the field of view in a horizontal plane and in a vertical plane; and
an electronic circuit coupled to the frame and configured to employ the sensor current signal to generate the lens control voltage signal.

24. The eyeglasses as recited in claim 23 wherein the earpieces are rotatably attached to either side of the frame.

25. The eyeglasses as recited in claim 23 wherein the light sensor is a photoelectric light sensor.

26. The eyeglasses as recited in claim 23 wherein the light sensor is integrated into the frame so as to sense ambient light to the front of the eyeglasses.

27. The eyeglasses as recited in claim 23 wherein the horizontal plane contains center points of the lenses, and the vertical plane is substantially perpendicular to the horizontal plane.

28. The eyeglasses as recited in claim 23 wherein the electronic circuit is further configured to convert the sensor signal to a pulse-width modulated signal having a proportional duty cycle and generate the lens control signal from the pulse-width modulated signal.

29. The eyeglasses as recited in claim 23 further comprising at least one battery configured to power the electronic circuit and the lenses.

30. The eyeglasses as recited in claim 23 further comprising a battery compartment in the frame.

31. The eyeglasses as recited in claim 23 further comprising an on/off switch coupled to the electronic circuit.

32. The eyeglasses as recited in claim 23 wherein the lenses each include a first glass substrate, a second glass substrate, and a liquid crystal material sealed therebetween; the first glass substrate having a first surface coated with an input polarizing film, a second surface coated with a first metal layer of indium tin oxide, and a first alignment layer coated over the first metal layer, the second glass substrate having a third surface coated with an output polarizing film, a fourth surface coated with a second metal layer of indium tin oxide, and a second alignment layer coated over the second metal layer, the first glass substrate and the second glass substrate being oriented such that the first alignment layer faces the second alignment layer, the lens signal being applied between the first metal layer and the second metal layer.

* * * * *